United States Patent
Jin et al.

(10) Patent No.: US 8,635,572 B1
(45) Date of Patent: *Jan. 21, 2014

(54) CIRCUITRY HAVING PROGRAMMABLE POWER RAILS, ARCHITECTURES, APPARATUSES, AND SYSTEMS INCLUDING THE SAME, AND METHODS AND ALGORITHMS FOR PROGRAMMING AND/OR CONFIGURING POWER RAILS IN AN INTEGRATED CIRCUIT

(71) Applicant: Marvell International Ltd., Hamilton (BM)

(72) Inventors: Jianwen Jin, Los Altos, CA (US); Eugene Ye, Saratoga, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/859,220

(22) Filed: Apr. 9, 2013

Related U.S. Application Data

(63) Continuation of application No. 13/111,435, filed on May 19, 2011, now Pat. No. 8,423,946.

(60) Provisional application No. 61/347,955, filed on May 25, 2010.

(51) Int. Cl.
*G06F 17/50* (2006.01)

(52) U.S. Cl.
USPC ........... 716/120; 716/118; 716/119; 716/126; 716/127; 716/128; 716/129; 716/130; 716/132; 716/133; 716/135; 716/139; 326/30; 326/33; 326/41; 326/47; 326/63; 326/80

(58) Field of Classification Search
USPC ......... 716/118–120, 126–130, 132–133, 135, 716/139; 326/30, 33, 41, 47, 63, 80
See application file for complete search history.

(56) References Cited

U.S. PATENT DOCUMENTS

| | | | |
|---|---|---|---|
| 5,763,907 A | 6/1998 | Dallavalle et al. | |
| 7,069,522 B1 | 6/2006 | Sluss et al. | |
| 7,073,147 B2 | 7/2006 | Ikeda et al. | |
| 7,398,489 B2 * | 7/2008 | Dinter et al. | ............... 716/115 |
| 7,546,566 B2 | 6/2009 | Chilwal et al. | |
| 2009/0228852 A1 | 9/2009 | Chilwal et al. | |

* cited by examiner

*Primary Examiner* — Nghia Doan

(57) ABSTRACT

Circuits, architectures, a system and methods for providing multiple power rails to a plurality of standard cells in a region of an integrated circuit. The circuitry generally includes a plurality of cells configured for connection to a first or second power rail, the first power rail providing a first voltage to at least one of the plurality of cells, and the second power rail providing a second voltage (which may be independent from the first voltage) to remaining cells in the plurality of cells. The method generally includes routing, in an IC layout, a first power rail providing a first voltage and a second power rail providing a second voltage, placing the plurality of cells, and selectively connecting first and second subsets of the plurality of cells to the first and second power rails, respectively. The present invention further advantageously minimizes regional layout design considerations and time delays.

21 Claims, 10 Drawing Sheets

(Background)

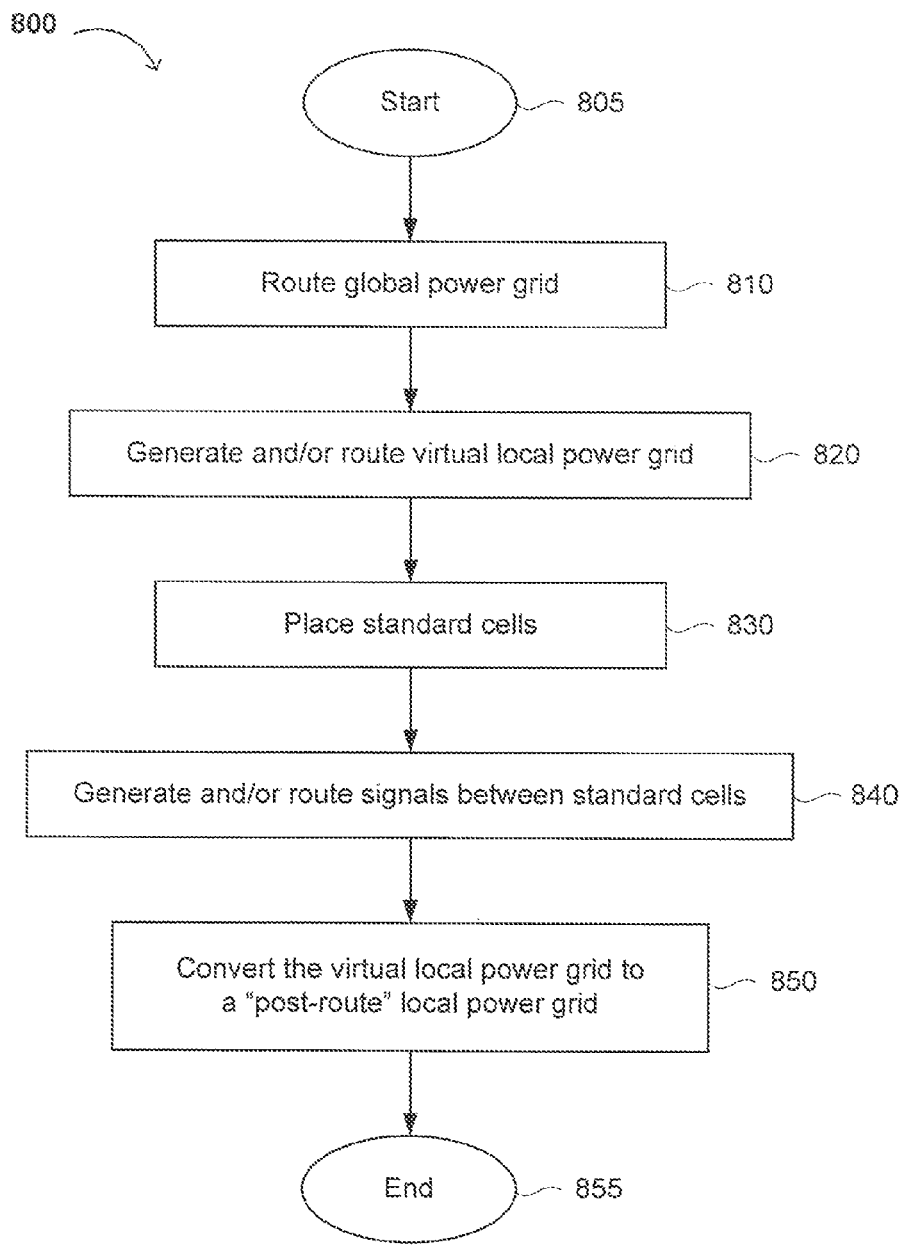

CIRCUITRY HAVING PROGRAMMABLE POWER RAILS, ARCHITECTURES, APPARATUSES, AND SYSTEMS INCLUDING THE SAME, AND METHODS AND ALGORITHMS FOR PROGRAMMING AND/OR CONFIGURING POWER RAILS IN AN INTEGRATED CIRCUIT

RELATED APPLICATIONS

The application is a continuation of U.S. patent application Ser. No. 13/111,435, filed May 19, 2011 (now U.S. Pat. No. 8,423,946), which claims the benefit of U.S. Provisional Patent Application No. 61/347,955, filed May 25, 2010, each of which is incorporated by reference herein in its entirety.

FIELD

The present disclosure generally relates to the field of integrated circuit (IC) design and standard cells for integrated circuits. More specifically, embodiments of the present invention pertain to integrated circuitry comprising multiple power rails, architectures and systems including such circuitry, and methods and algorithms for designing such circuitry using standard cells.

BACKGROUND

Conventional integrated circuits (ICs) are often designed to minimize dynamic power consumption and leakage. Leakage (static power consumption) is the power dissipated due to sub-threshold leakage and current flow through a reverse-biased p-n junction between diffusion and substrate. Leakage accounts for the majority of power dissipated when a standard cell in an integrated circuit is inactive, an important metric to measure and optimize for battery-powered applications.

Leakage in a standard cell in an IC increases as the size of the components in the cell decreases and as the thickness of the gate insulating layer of the transistors in the cell decreases. At smaller process geometries, leakage begins to dominate the power consumed by CMOS devices. In order to control both dynamic (switching) power consumption and leakage, engineers can employ various power management techniques.

One technique to reduce power consumption involves utilizing multi-voltage transistors, in which transistors with different switching thresholds are employed in different regions of the IC or chip. A second technique to reduce power consumption involves the use of power shut-off (PSO), which refers to completely powering down a chip's functional block (or group of standard cells receiving the same voltage from a common source) when it is not in use. This has been implemented in different blocks as hard macros or voltage islands.

Presently, in most IC design tools, a power grid is designed prior to standard cell placement. Specifically, a power grid comprising a global grid and a local grid are routed on a chip. The global grid comprises, in most chips, upper level metal layers that are used for global power distribution, usually having a thickness greater than that of the metal layers in the local grid. The local grid comprises, in most chips, lower level metal layers that serve as local interconnects (straps) between standard cell rails and the global grid. The standard cell rails may be considered part of the local grid. The local grid, in some embodiments, forms a block of approximately 5-100 microns per side.

The place and route process in such designs is based on standard cell placement and abutment, with shared power and ground rails. However, when different power nets (e.g., grids) are required for different standard cells, these fundamental assumptions can no longer apply. Thus, design workarounds are created and/or utilized. However, to date, such workarounds have had limitations.

One workaround involves voltage areas. A "voltage area" is generally a region of an integrated circuit layout in which the power supply rails of all standard cells in the region are coupled to a single power net. The cells in a voltage area can be coupled to one of a plurality of power nets, in which each power net is configured to operate at one of a plurality of different power-down states. In some chips, different voltage areas belonging to the same power domain are located in a variety of locations on the chip. Thus, a first voltage area belonging to a first power domain may be located on a side of the chip opposite from that of a second voltage area also belonging to the first power domain. Standard cells grouped in such voltage areas can be placed in non-ideal chip locations (e.g., locations not optimized for timing and routing). This leads to sub-par placement quality. To optimize certain parts of the design for timing, cells coupled to different power nets can be placed in nested voltage areas. In such instances, some nested voltage areas have hard macros with pins belonging to different power domains, resulting in uncommon voltage area patterns. Such irregular patterns create floor planning complications, such as signal timing issues and layout congestion. Thus, conventional implementation tools have problems or are impractical for implementing such designs.

Another design around utilizes dual rail cells (DRCs), having one pin that can receive a voltage from a common power supply rail, and a second pin (e.g., in the middle of the cell) configured to receive a voltage for "always on" (AON) cells (e.g., buffers) and clock isolation (ISO) cells. Certain DRCs also require a voltage to be applied at the first and second pins (e.g., dual rail flip-flops).

In the DRC methodology, a second power grid is routed to provide a common voltage to a plurality of DRCs. However, the routing resource requirements for such an approach can be significant, as in the case when all of the flip-flops in a design are DRCs. Additionally, the routing signal quality may be compromised. In addition, routing may be continuously altered during design optimization. Thus, significant work may be required to ensure that the second power grid is correctly routed prior to tapeout.

During synthesis of AON cells, cross-domain signals (e.g., signals from one AON voltage area to another AON voltage area across a domain that is typically off) may be a common occurrence. There may also be cases where a signal from one voltage area to another voltage area could be most effectively routed through an AON voltage area. This leads to design rule check violations. AON synthesis also generally attempts to utilize designated AON buffers, which can lead to inefficient circuit design.

A further technique to reduce power consumption involves a multi-supply, multi-voltage (MSMV) approach, which entails dividing a chip into areas (e.g., "power domains") supplied with different on/off states and/or different voltages, and then assigning the various functional blocks or standard cells forming the design to the different power domains. A power domain differs from a voltage area, in that power domains specify power intent (e.g., power-on or power-down states). In contrast, a voltage area is a region in which all of the standard cells have power rails coupled to a single power net. Typically, a power domain can consist of one or more corresponding voltage areas. In the MSMV technique, the power grid for each voltage area is laid out, and cells requiring a particular voltage are placed so that they can be connected to a desired power rail or strap in the grid. (Herein, a "rail" generally refers to a metal line or other physical structure on the IC that provides a relatively stable, predetermined voltage in a region of the IC. A "strap" generally refers to a relatively long, often straight power bus routed in one or more metal layers that connect between a rail and a global grid.)

Specifically, in a MSMV approach, power domains are specified by the voltages at which various circuitries operate. For example, some domains may be coupled to a first, relatively high voltage, some domains may be coupled to a second, relatively low voltage, and optionally, some domains may be coupled to a third voltage different from the first and second voltages. Domains operating at the same voltage generally have different on/off states or power-down cycles. Cells that receive the same supply voltage and that have the same power-on and power-down states may be considered to be in a "voltage area." The different voltage areas can be large or small, but in one design approach, they tend to be large in order to reduce the grid complexity for the chip.

For example, FIG. 1 shows a region 100 of an IC comprising a first voltage area 110 and a second voltage area 120. First voltage area 110 includes cells 101, 103, 105, 107, and 109, and second voltage area 120 includes cells 111, 113, 115, 117, and 119. Each of the plurality of cells in voltage area 110 comprises a first pin (e.g., pin 102 in cell 101) configured to receive a ground potential (e.g., a potential of about zero volts) from power strap (strap) 150 via power rail 152. Strap 150 is configured to receive a ground potential from an external ground source (not shown) during an operational state (e.g., an ON state) of the circuitry in voltage area 110. Additionally, each of the plurality of cells in the first voltage area 110 includes a second pin (e.g., pin 104 in cell 101) configured to receive a first voltage (e.g., a predetermined or reference voltage) via power rail 142 from power strap 140. Strap 140 receives the first voltage from an external voltage source (not shown). Thus, during the operational state, each cell in the first voltage area 110 receives the first voltage and is coupled to the ground potential.

Similarly, each of the plurality of cells in the second voltage area 120 comprises a first pin (e.g., pin 112 in cell 111) configured to receive the ground potential from strap 150 via power rail 154. As discussed above, strap 150 is configured to provide a ground potential during an operational state of the second voltage area 120. Additionally, each of the plurality of cells in the second voltage area 120 includes a second pin (e.g., pin 114 in cell 111) configured to receive a second voltage (e.g., a predetermined or reference voltage) via power rail 162 from power strap 160. The first and second pins (e.g., pin 102 and pin 104 in cell 101) are static rail pins (SRPs). Standard cells having SRPs are generally placed adjacent to each other, and the SRPs are connected to a common power grid in the same domain or voltage area. Strap 160 receives the second voltage from an external voltage source (not shown). Thus, during the operational state, each cell in the second voltage area 120 receives the second voltage and is coupled to the ground potential. Furthermore, during the operational state, each of the cells in the second voltage area 120 may operate at a voltage different from that of the cells in the first voltage area 110.

By utilizing different voltage areas, the voltage provided to the first voltage area 110 (i.e., cells 101-109 in FIG. 1) can remain in the operating mode (e.g., an "ON" state), while the voltage provided to the second voltage area 120 (i.e., cells 111-119 in FIG. 1) can be switched off when the circuitry in the second voltage area 120 is in a non-operational state (e.g., an "OFF" state). Doing so reduces the power consumed by the second voltage area 120 of IC 100, thus minimizing the dynamic power consumption. By configuring first and second voltage areas 110 and 120 to operate at different voltages, the static and dynamic power consumption in the IC can be reduced or minimized.

However, one problem associated with voltage area-based designs (e.g., the design of FIG. 1 having first and second regions 110 and 120) is that such designs utilize power straps 140 and 160 and power rails 142 and 162 that can inhibit cell placement. That is, with conventional circuits like those in area 100, only those cells operating at the first voltage can be grouped in the first region 110 of FIG. 1, while those cells operating at the second voltage must be grouped in a different region (e.g., the second region 120 of FIG. 1). Thus, cells cannot be freely placed, and in some instances, such designs require repeated changing of the RTL code during circuit design to put cells into particular hierarchies that belong to a particular power domain or voltage area. However, instead of creating a large number of voltage areas (e.g., greater than 10), cell modules belonging to the same power domain were grouped together and placed adjacent to a limited number of voltage areas. Power grids were then drawn accordingly. However, doing so increased design costs and reduced design efficiency.

Additionally, voltage area- or region-based layout designs can inhibit or impede designing for ideal or optimal timing conditions. For example, referring to FIG. 1, cell 101 may be designed to communicate with cell 119 (e.g., via data connections not shown in FIG. 1). Ideally, for optimal timing, cell 101 would be placed adjacent to cell 119. However, due to each cell's respective voltage requirement, cell 101 is placed in first region 110, and cell 119 is placed in second region 120. Thus, the distance between the two cells can cause significant timing issues (e.g., a time delay) when the cells belong to different voltage regions. As a result, regional layout designs can limit cell placement and inhibit or impede compliance with timing constraints.

Additionally, the MSMV technique and the PSO technique require the insertion, placement, and connection of specialized power management structures, such as level shifters, power pads, switch cells, isolation cells, and state-retention cells. Furthermore, some inter-voltage area (VA-VA) buffering designs can be problematic. For example, design optimization tends to add buffers with a hierarchy defined for one voltage area, but such buffers cannot be placed outside that particular voltage area. For more detailed designs, voltage area designs create floorplan and implementation problems. Although techniques such as MSMV design can reduce static and dynamic power consumption, such techniques increase the complexity associated with design, verification, and implementation tools and methodologies. For example, MSMV techniques can lead to significant increases in tapeout schedule, tool runtime, timing closure, ECO checking, multi-voltage rule checking, and design rule check (DRC)/layout versus schematic (LVS) debugging. Furthermore, while using a single technique (e.g., MSMV) in isolation may be relatively simple, often a combination of these techniques (e.g., MSMV and PSO) is used to meet certain power targets. Using multiple techniques concurrently increases the complexity of the development flow.

This "Background" section is provided for background information only. The statements in this "Background" are not an admission that the subject matter disclosed in this "Background" section constitutes prior art to the present disclosure, and no part of this "Background" section may be used as an admission that any part of this application, including this "Background" section, constitutes prior art to the present disclosure.

SUMMARY

Embodiments of the present invention relate to circuits, architectures and systems having a plurality of straps, and methods for designing integrated circuitry having multiple power rails using standard cells. The circuit generally comprises a plurality of cells in a first region, each of the plurality of cells being configured for connection to any one of a plurality of power rails; a first power rail of the plurality of power rails, coupled to at least one of the plurality of cells, the first power rail providing a first voltage; and a second power rail of the plurality of power rails, coupled to at least a remaining one of the plurality of cells, the second power rail providing a second voltage. The first and second voltages may be independent from each other (e.g., not electrically connected to the same power supply) and may be the same or different. The architectures and/or systems generally comprise a circuit embodying one or more of the inventive concepts disclosed herein.

The present circuit generally has a configuration that enhances cell placement and legalization. By utilizing first and second power rails providing independent voltages, in which any rail can be coupled to any of a plurality of cells in a particular region of the circuit, cells in the same region can operate with different power on and/or power-down states and/or at different voltages and be placed in proximity to each other. That is, placement of a cell in the integrated circuit can be made somewhat independent of the cell's power supply.

The method generally comprises routing each of a plurality of power rails in an integrated circuit (IC) layout, the plurality of power rails comprising (i) a first power rail providing a first voltage and (ii) a second power rail providing a second voltage; placing the plurality of cells in the IC layout, wherein each of the plurality of cells can be connected to either of the first power rail or the second power rail; and selectively connecting a first subset of the plurality of cells to the first power rail and a second subset of the plurality of cells to the second power rail. By utilizing the present method, a cell configured to operate according to one power-down routine or at one voltage can be placed in proximity to a cell configured to operate according to a different power down routine or at a different voltage. With such an arrangement, regional layout design considerations and time delays in signal propagation can be minimized, and power isolation can be elevated from an IC region level to a cell pin level.

As mentioned above, although techniques such as MSMV design can reduce static and dynamic power consumption, power reduction should also be considered with other design goals in a simultaneous and multi-objective approach. Use of multiple design techniques mandates a development environment and/or design tools that can adequately address all of these issues. As a result, embodiments of the present disclosure advantageously minimize the use of defined voltage areas and/or power domains in an IC, and standard cells can be placed in the IC based on timing or congestion considerations. Additionally, the present disclosure provides circuitry in which multiple power rails are provided to the same region so that cells operating according to different power down states and/or at different voltages can be placed in proximity to each other. By placing the cells in the same region, timing delays can be minimized by reducing the length of the wiring between cells configured to communicate with each other, even when the cells are configured to operate in different power states.

Stated differently, the present disclosure does not require cell placement based on voltage area, nor does the present methodology require AON ("always on" cell) synthesis. In embodiments of the present disclosure, design optimization is performed similar to single voltage designs. However, standard cells should be coupled to or associated with a particular power net (e.g., in a way that does not violate associated design rules). Furthermore, the present disclosure does not require domain boundary-sensitive dual rail isolation cells or buffers.

The present disclosure utilizes standard cells having a plurality of dynamic rail pins (DRPs). Thus, the physical connection of the standard cells to a power rail is configurable (and, in some embodiments, automatically reconfigurable) using design/EDA software. DRPs are, in effect, virtual pins in a standard cell layout that, depending on the performance targets of the particular circuit at hand, can be dynamically relocated or reshaped in a "post-route" (e.g., following routing in a place and route design process) database used on the assigned power net. Most standard cells can have only one actual power pin. Exceptions include data retention flip-flops and level shifters, which require two pins to supply different voltages to different gates. Since standard cell rail pins are automatically configurable, they can be connected to different power rails, thus removing the need for predefined and/or geographically-limited voltage areas or power domains. With the present circuitry, there is no limitation on isolation cell and/or level-shifter placement, but it may be preferable to place such circuitry closer to a predetermined load. Additionally, isolation becomes a pin-based event. That is, whenever a driver or other circuit is powered by a net that is powered down more often than another driver or circuit, load isolation between the different drivers or circuits may be required. A "post-route" process for replacing and/or reconfiguring standard cell power pins can be performed once cell placement and signal routing have been performed.

The present disclosure also comprises an enhanced legalization/local optimization algorithm that can be utilized to minimize the number of voltage rails having cells requiring different power supplies, and to derive a correct power domain for optimization-added cell pins. By utilizing the present algorithm, it is estimated that ninety-five percent (95%) or more of voltage regions on an integrated circuit (chip) that do not utilize dual rail standard cells can be placed in standard cell row portions configured to operate with a single supply/rail. Additionally, in some embodiments, the present algorithm can place a particular standard cell (e.g., a dual rail or dual supply standard cell) in a voltage column to provide a second voltage to such cells.

These and other advantages of the present invention will become readily apparent from the detailed description of preferred embodiments below.

BRIEF DESCRIPTION OF THE DRAWINGS

FIG. 6 illustrates a "post-route" method 800 for creating a power grid according to the present disclosure.

DETAILED DESCRIPTION

Figure 1:
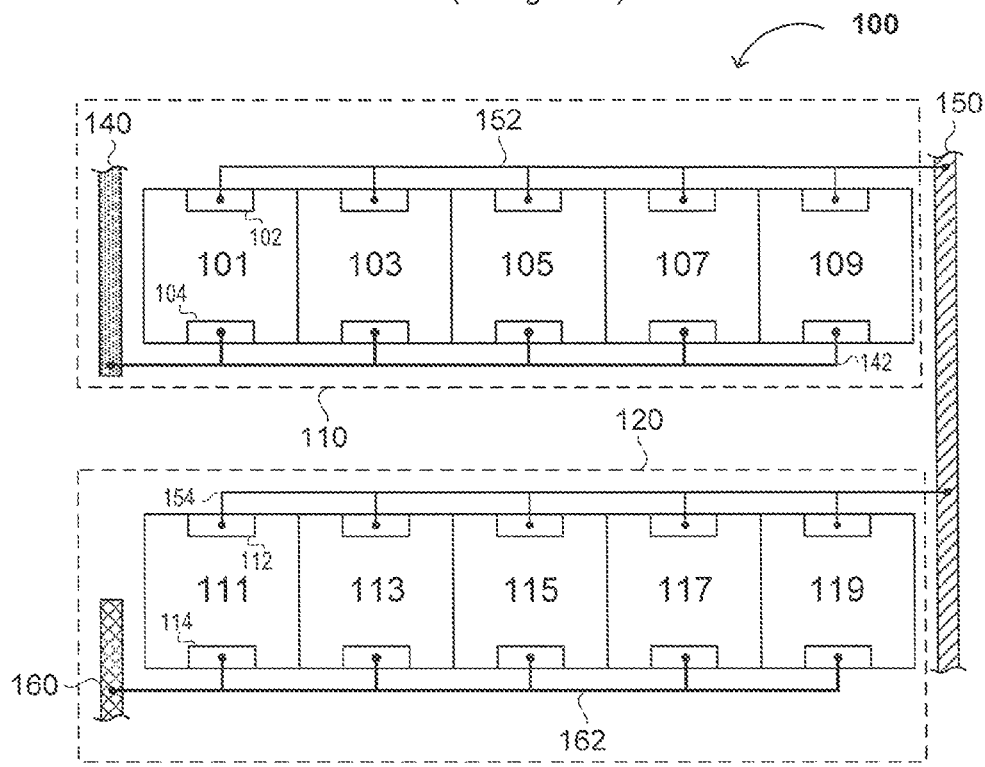
FIG. 1 is a diagram showing a region 100 of a conventional IC layout.

Reference will now be made in detail to various embodiments of the disclosure, examples of which are illustrated in the accompanying drawings. While the invention will be described in conjunction with the embodiments provided below, the embodiments are not intended to limit the invention. On the contrary, the invention is intended to cover alternatives, modifications and equivalents that may be included within the scope of the appended claims. Furthermore, in the following detailed description, numerous specific details are set forth in order to provide a thorough understanding of the present disclosure. However, the present invention may be practiced without these specific details. In other instances, well-known methods, procedures, components, and circuits have not been described in detail so as not to unnecessarily obscure aspects of the present disclosure.

Some regions of the detailed descriptions which follow are presented in terms of processes, procedures, logic blocks, functional blocks, processing, and other symbolic representations of operations on data bits, data streams or waveforms within a computer, processor, controller and/or memory. These descriptions and representations are generally used by those skilled in the data processing arts to effectively convey the substance of their work to others skilled in the art. A process, procedure, logic block, function, operation, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer, data processing system, or logic circuit. It has proven convenient at times, principally for reasons of common usage, to refer to these signals as bits, waves, waveforms, streams, values, elements, symbols, characters, terms, numbers, or the like.

All of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer, data processing system, logic circuit or similar processing device (e.g., an electrical, optical, or quantum computing or processing device), that manipulates and transforms data represented as physical (e.g., electronic) quantities. The terms refer to actions, operations and/or processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, for the sake of convenience and simplicity, the terms "connected to," "coupled with," "coupled to," and "in communication with" (which terms also refer to direct and/or indirect relationships between the connected, coupled and/or communicating elements unless the context of the term's use unambiguously indicates otherwise), but these terms are also generally given their art-recognized meanings.

The present disclosure concerns a circuit including a plurality of cells that can be connected to any of a plurality of power rails, an architecture and/or system including the circuit, and a method and algorithm for designing an IC using standard cells that can be programmably coupled to any one of a plurality of power rails in an IC. The present disclosure minimizes or virtually eliminates certain time delays associated with layout designs that include different power domains or voltage areas, and eliminates the dependency of cell placement on pre-defined power domains/voltage areas or pre-existing power rails. The invention, in its various aspects, will be explained in greater detail below with regard to various embodiments.

An Example of a Standard Cell Configuration

Many state-of-the-art integrated circuits (e.g., a system-on-chip [SoC] IC) contain analog, digital, and mixed signal functions, any of which can be implemented using a combination of standard cells. Examples of standard cells and/or functional blocks for use in such integrated circuits include flip-flops, input and output buffers, input and output drivers, inverters, registers, memory cells (e.g., SRAM, DRAM, ROM, EPROM, flash, etc.), multipliers, dividers, adders, subtractors, comparators, amplifiers, level shifters, reference voltage generators, voltage dividers, interface blocks (e.g., an I2C [Inter-Integrated Circuit] interface, a general purpose I/O block, etc.), logic gates (e.g., an AND gate, a NAND gate, a NOR gate, an XOR gate, etc.), and communication blocks (e.g., a universal asynchronous receiver/transmitter [UART], etc.).

Figure 2A:
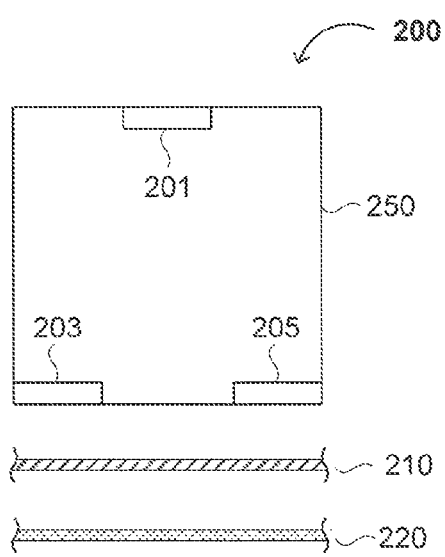
FIG. 2A is a diagram showing a standard cell 250 configured to be coupled to any one of a plurality of power rails according to the present disclosure.

FIG. 2A illustrates a standard cell 250 having a programmable power pin configuration. In FIG. 2A, the standard cell 250 is placed in an IC layout 200, and first and second power rails 210 and 220 are routed in proximity to the standard cell 250. Alternatively, the power rails 210 and 220 are routed, then the standard cell 250 is placed in proximity to the power rails 210 and 220. Power rails 210 and 220 can be routed in the same metal layer, which in some embodiments may reduce capacitive coupling between the power rails or between a power rail and metal lines in other metal layers. Alternatively, power rails 210 and 220 can be routed in different metal layers (e.g., power rail 210 may be routed in a layer above that of power rail 220, such that power rail 210 overlaps or nearly overlaps power rail 220) to reduce the area devoted to routing the two power rails.

As illustrated, standard cell 250 comprises a ground pin 201, configured to receive a ground potential (e.g., a potential of about zero volts) from an external ground source (not shown). Additionally, and for purposes of illustration, standard cell 250 comprises a plurality of power pins (i.e., pins 203 and 205), each configured to receive a voltage from one of first and second power rails 210 and 220. The voltages on power rails 210 and 220 are independent of each other, and are generally in the range of from about 0.8V to 5V (e.g., from about 0.8V to about 2.5V or 3.0V).

Figure 2B:
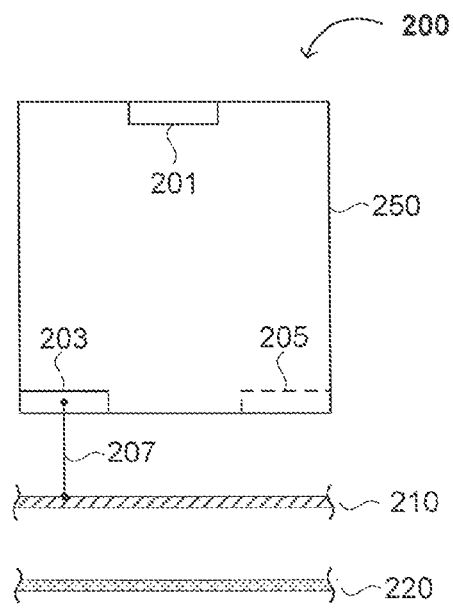
FIGS. 2B and 2C illustrate a region 200 of an IC showing the standard cell 250 of FIG. 2A coupled to one of the plurality of power rails 210 or 220 according to the present disclosure.

For example, as illustrated in FIG. 2B, the first power pin 203 of standard cell 250 is programmed to receive the voltage from the first power rail 210. That is, power rail 210 is routed to first power pin 203 via programmable connection 207. To avoid the standard cell 250 receiving more than one power supply, the second power pin 205 can be electronically removed (as indicated by the dashed lines) from the standard cell 250 when the first power rail 210 is programmably connected to the first power pin 203 during a place-and-route process. As a result, no connection is made between the second power rail 220 and the second power pin 205.

Figure 2C:
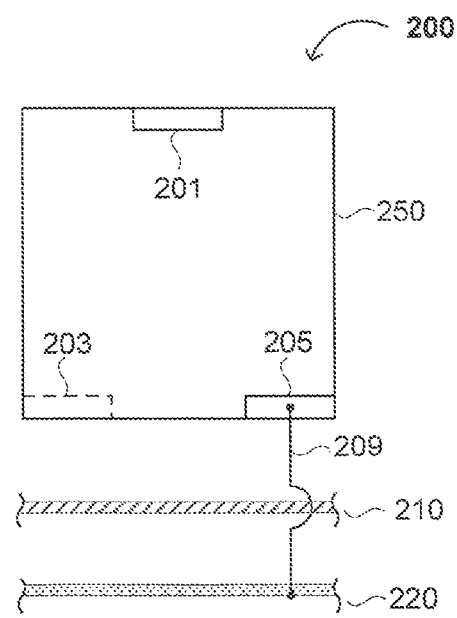

Similarly, as illustrated in FIG. 2C, the second power pin 205 of standard cell 250 is programmed to receive the voltage from the second power rail 220. That is, power rail 220 is routed to the second power pin 205 via programmable connection 209. To avoid the standard cell 250 receiving more than one power supply, the first power pin 203 may be electronically removed (as indicated by the dashed lines) from the standard cell 250 when the second power rail 220 is programmably connected to the second power pin 205 during the place-and-route process. As a result, no connection is made between the first power rail 210 and the first power pin 203.

In the embodiment of FIGS. 2A-2C, a voltage is received by standard cell 250 at an internal power supply node (e.g., power pin 203 or power pin 205). In such cells, the voltage may be routed (via an internal power rail) to a different circuit (e.g., a voltage conversion circuit, such as a step-up or step-down circuit) to enable certain predetermined performance characteristics for the cell. By utilizing various internal power rail configurations in the standard cells, the present approach provides multiple power nets to a group of standard cells in a particular or predetermined region of the IC via multiple power straps and/or rails, such that one or more standard cells in the region can be placed in an inactive or power-down state, while one or more other standard cells in the region can remain in an active or power-on state.

Figure 2D:
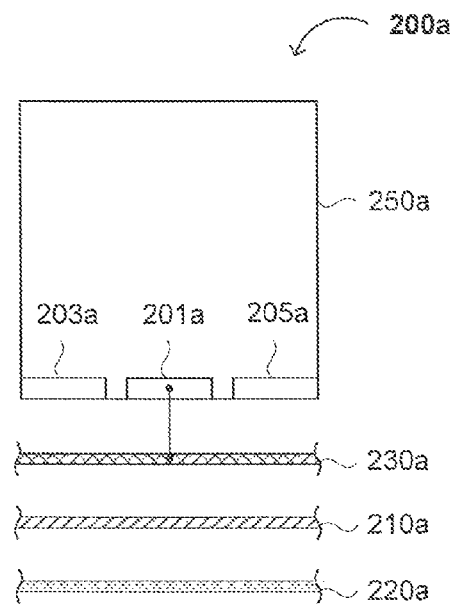
FIGS. 2D and 2E illustrate alternative standard cells 250a and 250b, having various pin locations configured for coupling to alternatively-routed power rails and ground supply.

Although pins 203 and 205 of standard cell 250 in FIGS. 2A-2C are located on the same side of standard cell 250 (opposite to that of pin 201), in certain configurations, one or both of the pins 203 and 205 may be located on the same side as that of pin 201. For example, as shown in FIG. 2D, IC layout 200a comprises standard cell 250a, comprising pins 201a, 203a, and 205a. Similar to pin 201 of standard cell 250 in FIG. 2A, pin 201a of standard cell 250a is configured to receive a ground potential (e.g., a potential of about zero volts) from an external ground source (not shown) via ground supply 230a. Additionally, pin 203a may be configured to receive a first voltage via a first power rail (e.g., via first power rail 210a), and pin 205a may be configured to receive a second voltage via a different power rail (e.g., via second power rail 220a). In various embodiments, the first and second voltages can be the same or different.

In the embodiment of FIG. 2D, power rails 210a and 220a can be placed in the same metal layer, which in some cases may reduce capacitive coupling between the rails, depending on the dimensions of the rails and the pitch (spacing) between the rails. Alternatively, power rails 210a and 220a can be placed in different metal layers (e.g., first power rail 210a may be placed in a layer above that of second power rail 220a) to reduce the area devoted to routing the two power rails. As shown, by placing each power supply (e.g., voltage and ground supply) pin on one side of standard cell 250a, each of the power rails (e.g., power rails 210a and 220a) and the ground supply rail 230a can be routed between adjacent rows of standard cells, thereby centralizing the location of the ground supply and power rails.

Figure 2E:
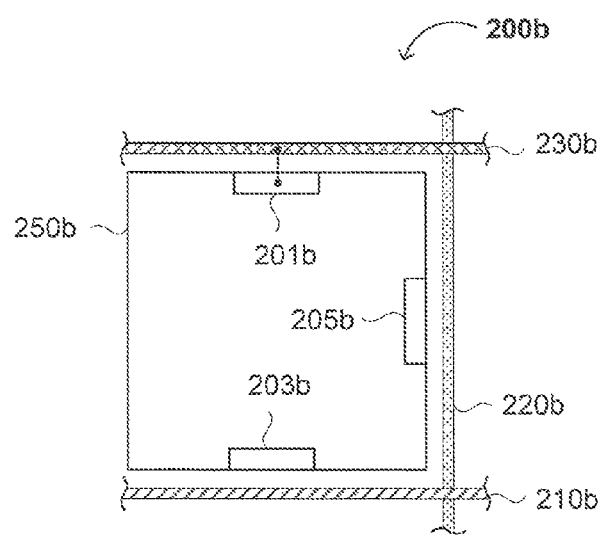

In other configurations, such as that shown in FIG. 2E, an IC layout 200b comprises standard cell 250b, first and second power rails 210b and 220b, and ground supply rail 230b. Standard cell 250 comprises pins 201b, 203b, and 205b. Pin 201b, like pin 201a of FIG. 2D, is configured to receive a ground potential from ground supply 230b. Pin 203b may be configured to receive a first voltage from a first power rail, and pin 205b may be configured to receive a second voltage. Typically, the first and second voltages have the same value, but in some cases, the first and second voltages may be different. However, unlike standard cell 250a of FIG. 2D, each of the pins in standard cell 250b are located on different (orthogonal) sides of the standard cell. In the embodiment of FIG. 2E, power rails 210b (e.g., a first power rail) and 220b (e.g., a second power rail) are necessarily in different metal layers. Utilizing different metal layers for power rail placement generally reduces the area consumed by the first and second power rails 210b and 220b, respectively, relative to embodiments in which the power rails are in the same layer, reduces capacitive coupling relative to embodiments where the power rail(s) and/or ground supply are on the same side of the standard cell (e.g., a parallel power rail configuration), and may enable the second power rail 220b to be placed closer to the standard cell 250b.

Ground supply 230b, configured to provide a ground potential via an external voltage source (not shown), is routed in proximity to pin 201b. Similarly, first power rail 210b, configured to provide a first voltage via an external voltage source (not shown), is routed in proximity to pin 203b, and second power rail 220b, also configured to provide the first voltage, is routed adjacent to pin 205b. Thus, by utilizing the pin configuration shown in FIG. 2E, power supply power rails can be routed at a 90° orientation to each other, thereby minimizing capacitive coupling between second power rail 220b and each of the first power rail 210b and ground supply 230b, and enabling consumption of less chip real estate than certain configurations of the IC shown in FIGS. 2A and 2D.

In some embodiments, the standard cell architecture (e.g., standard cell 250 in FIGS. 2A-2C, standard cell 250a in FIG. 2D, or standard cell 250b in FIG. 2E) has reconfigurable power and/or ground supply pins. Instead of pre-drawn and/or location-fixed power supply pins, the standard cell architecture can place each pin at any of a plurality of locations in the standard cell prior to or after placement of the standard cell, but prior to connecting the pin to a power rail. Alternatively, the standard cell architecture can have multiple copies of each pin at different locations in the cell (e.g., a copy of pin 203b in FIG. 2E may be at each of the four boundary lines of the cell 250b). In various embodiments, the pins may be touching or not touching the standard cell boundary (e.g., one copy of pin 203b may be at the boundary of the cell 250b, and a second copy of pin 203b may be inside the cell 250b). The pins may be selectively kept, placed or removed, based on how the power rails are routed and/or generated (e.g., in the post route stage; see the discussion of a method of generating a post-route local grid below).

An Example of a Circuit and/or Architecture

Figure 3A:
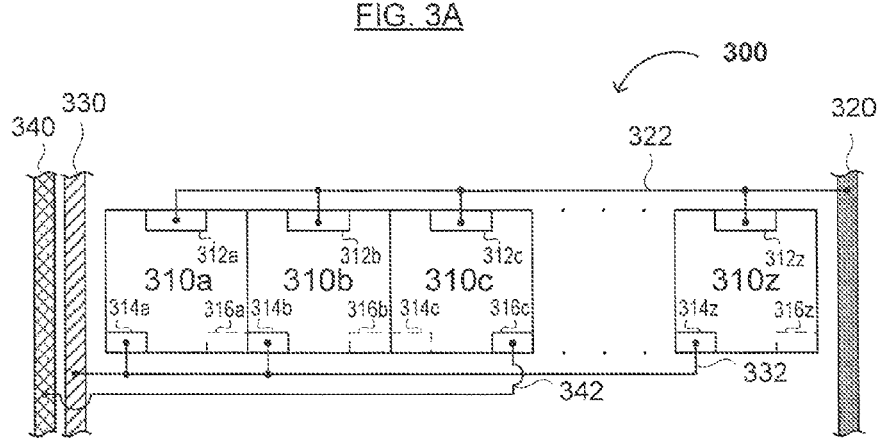
FIG. 3A is a diagram showing a region 300 of an IC utilizing a multiple power rail configuration according to an embodiment of the disclosure.

FIG. 3A shows a region 300 of an IC according to an embodiment of the present disclosure. As illustrated, region 300 utilizes dual power straps (e.g., straps 330 and 340), wherein the first power strap is configured to provide a first predetermined or reference voltage during a first operational state, and the second power strap is configured to provide a second predetermined or reference voltage during a second operational state, the second voltage being independent from the first voltage. In various embodiments, the power straps 330 and 340 may provide a voltage of from about 0.5 to about 5.0V (e.g., about 1.0V to about 2.5V). Power straps 330 and 340 are respectively connected to power supplies (not shown) capable of providing the first voltage and the second voltage, but either or both of the straps 330 and 340 can be switchably disconnected from its respective power supply. For example, during the first operational state, power is provided to power strap 330 from the corresponding power supply. Similarly, during the second operational state, power is provided to power strap 340 from the corresponding power supply.

Each of the plurality of standard cells 310a, 310b, 310c, . . . 310z in region 300 comprises a first pin (e.g., pins 312a, 312b, 312c, . . . 312z) configured to receive a ground potential from ground supply 322 (via strap 320). Strap 320 is configured to provide a ground potential (e.g., a potential of about zero volts) from an external ground source (not shown). Additionally, similar to the standard cells 250, 250a, and 250b discussed above with respect to FIGS. 2C-2E, each of the plurality of standard cells 310a, 310b, 310c, . . . 310z in region 300 includes second and third pins (e.g., pins 314a and 316a in standard cell 310a, pins 314b and 316b in standard cell 310b, etc.) configured to receive a voltage via the first power rail or the second power rail. For example, standard cell 310a is configured to receive a first voltage at pin 314a via first power rail 332. If standard cell 310a receives the first voltage at pin 314a, no voltage is provided at pin 316a. As a result, pin 316a may be electronically removed (as indicated by the dashed lines) from standard cell 310a. As shown in FIG. 3A, standard cells 310b and 310z also receive the first voltage via first power rail 332 (e.g., via pins 314b and 314z of standard cells 310b and 310z, respectively). As a result, pins 316b and 316z may also be electronically removed (as indicated by the dashed lines) from standard cells 310b and 310z, respectively.

However, standard cell 310c is coupled to second power rail 342, and receives a second voltage (via power strap 340) at pin 316c, in which case in 314c may be electronically removed, as indicated by the dashed lines. Thus, as illustrated, each of the standard cells in region 300 operates using the first voltage or the second voltage, provided by first power rail 332 or second power rail 342, respectively, and standard cells receiving different power supplies from different rails can be placed in proximity to each other in the same region 300 of the IC.

Thus, as illustrated in FIG. 3A, the present circuitry allows for a plurality of power rails to be provided to a region of an IC comprising a plurality of standard cells. The second power rail 342 can be provided in the same or different metal layer as the first power rail 332, and the second power strap 340 can be provided in the same or different metal layer as the first power strap 330. Furthermore, the first power rail 332 can be provided in the same or different metal layer as the first power strap 330, and the second power rail 342 can be provided in the same or different metal layer as the second power strap 340. In one embodiment, the first power rail 332 is in a different metal layer from the first power strap 330, and the second power rail 342 is in a different metal layer from the second power strap 340. In this embodiment, the first and second power rails 332 and 342 may be respectively connected to the first and second power straps 330 and 340 by one or more conventional vias.

Additionally, the present pin configuration does not require the power rail to connect to a standard cell boundary. That is, the pin(s) can be located inside the standard cell. The (internal) power supply to the transistors in the cells 310a-310z can be configured to receive either a first voltage (e.g., VDD) or a second voltage (e.g., VDD1), or some of the cells (e.g., cells 310a, 310b, and 310z) may be configured to receive VDD and some of the cells (e.g., cell 310c) VDD1. The multiple-power rail cell configuration functions properly with modern nanometer-scale CMOS manufacturing processes and standard cell design (e.g., 90 nm or less, 65 nm or less, or 45 nm or less, such as 28 nm). For example, connections in lower levels metallization (e.g., the first and/or second levels of metallization) are typically present in standard cell designs for local interconnection to one of a plurality of power rails in standard 28 nm processing.

The present use of virtual pins and automatic physical reconfiguration (as discussed in more detail below with respect to FIGS. 4A-4C) is quite feasible in standard cell libraries implemented in manufacturing technologies in which the dimensions of the integrated circuit are limited by the dimensions of the bonding pads, analog circuit blocks or cells, and/or hard macros (e.g., 40 nm and below, 28 nm and below, etc.). Some standard cell libraries in such manufacturing technologies utilize global power rails within the cells due to strict patterning requirements in certain layers (e.g., a polysilicon or gate layer). Thus, local power rails over a standard cell can be routed in any of a plurality of metallization layers. Although there is a chip real estate disadvantage associated with such configurations, such disadvantages are easily minimized in technologies that are bond pad-, analog block/cell- and/or hard macro-limited. Thus, a lower utilization of standard cell area can be expected with 28 nm technology. For example, the local power grid can be muted in certain lower levels of metallization (e.g., M1 or M2) that are typically used mostly for local jogging since the certain lower level(s) of metallization may be used in the standard cell itself. Thus, configurable first and second power grid rails can utilize the vacant metallization layer space above the local routing within the standard cell.

Furthermore, standard cells with dynamic (virtue) pins may be larger than corresponding single-rail or static rail standard cells (e.g., in some instances, approximately 10% larger). However, in some embodiments, such an arrangement may increase power rail uniformity. That is, utilizing the larger cells allows the present circuitry to align standard cells more effectively and/or efficiently, and simplify the power grid routing algorithm/routine.

As illustrated in FIG. 3A, the circuitry in region 300 does not require a single defined voltage or power. That is, design engineers (or software-based placers) do not need to consider placement of each cell according to predefined (e.g., pre-placed and/or pre-routed) voltage areas, and cells can be placed somewhat freely, without voltage requirement limitations. However, the designer or placer may consider the existing power grid distribution (rather than the standard cell power rail pre-route algorithm) to determine whether cells configured to operate at a certain voltage can be placed in a particular region of the IC. If the cell is placed sufficiently close to a corresponding power rail on the existing power grid, the designer can add local power straps, horizontally or vertically, in the region of the IC including the cell, where no corresponding power straps may have existed in the layout of the pre-existing grid. Once cell placement is accomplished, based on an original power intent file (e.g., the power specification), a place and route (P&R) tool can identify which cell should connect to which power rail or power net. During the placement legalization or finalization, the designer or P&R tool should ensure that, within each row between two vertical power straps, the standard cells can be connected to no more than the number of different power nets or rails provided between the straps (e.g., adjacent vertical straps are included in the power nets used by the two rails). If the cell requires a voltage different from the two voltage rails, the cell may be placed in another region where a third unique voltage is provided. Thus, some design considerations according to the present disclosure include grouping cells with the same power net connectivity (e.g., capability to be connected to any of a plurality of power rails in the region) in proximity to each other, and moving those cells that function at a different voltage (i.e., that have a different power net connectivity) to another region of the IC.

Compiling the standard cells is based on the power net to which each cell is connected. The extra power pin(s) (that is, the power pin[s] not programmably connected to a voltage) are removed (e.g., if a conflict is created), or the power pins are merged (e.g., if a conflict is not created). Once each cell is connected to a power rail (and, optionally, has a single power pin), the rails are considered correctly connected, and the standard cell placement is finalized.

A Second Example of a Circuit and/or Architecture

Figure 3B:
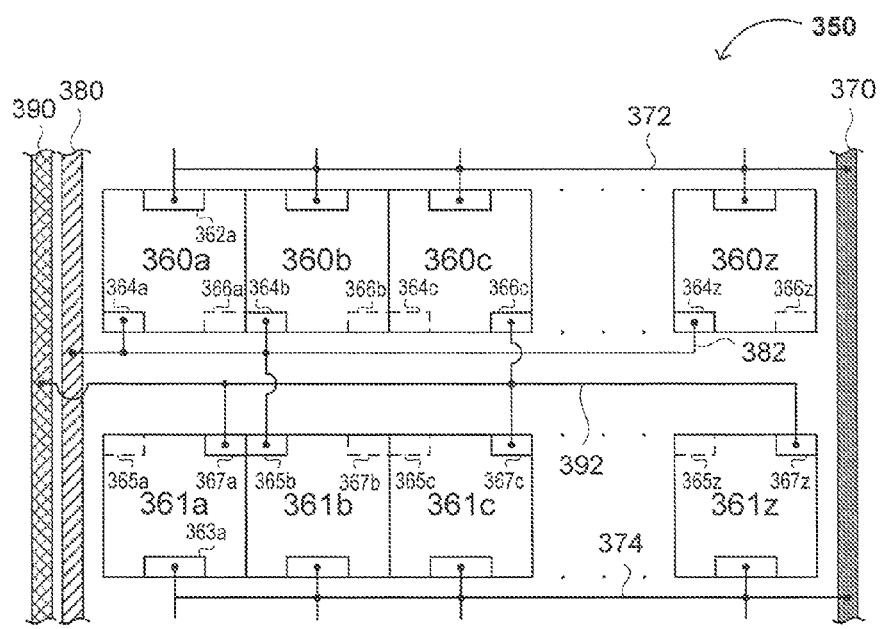
FIG. 3B is a diagram showing a region 350 of an IC utilizing a multiple power rail configuration according to a further embodiment of the disclosure.

FIG. 3B identifies a region 350 of an IC according to a second embodiment of the present disclosure. Specifically, FIG. 3B discloses a region 350 comprising dual power straps (e.g., first power strap 380 and second power strap 390), each configured to provide a voltage to a plurality of standard cells 360a, 360b, 360c, . . . 360z and 361a, 361b, 361c, . . . 361z. Additionally, and similar to region 300 in FIG. 3A, each of the plurality of standard cells in region 350 is coupled to a ground potential. Ground strap 370 is configured to provide a ground potential (e.g., a potential of about zero volts) to each of the plurality of standard cells via power rails 372 and 374. For example, standard cells 360a and 361a receive the ground potential at pins 362a and 363a via power rails 372 and 374, respectively. First and second power straps 380 and 390, respectively, are switchably connectable to a power supply (not shown) capable of providing corresponding first and second voltages to the standard cells.

As discussed above, first and second power straps 380 and 390 are routed in region 350. First power strap 380 is configured to provide a first predetermined or reference voltage during a first operational state, and second power strap 390 is configured to provide a second predetermined or reference voltage independent from the first voltage during a second operational state. During the first operational state, power is provided from the power supply to first power strap 380 during a first power-on time, but not during a first power-down time. Similarly, during the second operational state, power is provided from the power supply to second power strap 390 during a second power-on time, but not during a second power-down time. Generally, the first power-on time and first power-down time differ from the second power-on time and second power-down time, respectively. In various embodiments, first and second power straps 380 and 390, respectively, may provide a voltage of from about 0.5 to about 5.0V (e.g., from about 0.8V to about 2.5V).

Region 350 includes alternating rows of standard cells 360a-z and 361a-z. Power rails 382 and 392 (respectively connected to first and second power straps 380 and 390, respectively) are routed between the alternating rows of standard cells, as are ground supplies 372 and 374. This arrangement enables a single rail and a single ground supply to be connected to at least two rows of standard cells (and up to four rows if another rail is mirrored on the left-hand side of the first power strap[s] 380 and/or the second power strap 390 and/or if another ground supply is mirrored on the right-hand side of the strap 370).

In the example shown in FIG. 3B, standard cells 360a, 360b, 360z, and 361b are configured to receive the first voltage from first power rail 382 at pins 364a, 364b, 364z, and 365b, respectively. Pins 366a, 366b, 366z, and 367b may be electronically removed (as indicated by the dashed lines) from standard cells 360a, 360b, 360z, and 361b, respectively. As a result, no voltage is provided at pins 366a, 366b, 366z, and 367b of standard cells 360a, 360b, 360z, and 361b, respectively. Additionally, standard cells 360c, 361a, 361c, and 361z are configured to receive the second voltage from second power rail 392 at pins 366c, 367a, 367c, and 367z, respectively. Pins 364c, 365a, 365c, and 365z may be electronically removed (as indicated by the dashed lines) from standard cells 360c, 361a, 361c, and 361z, respectively. As a result, no voltage is provided at pins 364c, 365a, 365c, and 365z of standard cells 360c, 361a, 361c, and 361z, respectively.

Thus, all of the plurality of standard cells (e.g., 360a, 360b, 360c, . . . 360z, 361a, 361b, 361c, . . . 361z) are configured to receive either the first voltage or the second voltage via first or second power rail 382 or 392, respectively, but actually receive only one of the two voltages. Such a configuration, similar to that discussed above with respect to FIG. 3A, may reduce time delays between standard cells configured to (i) communicate with each other and (ii) operate according to different power cycles. For example, when a first standard cell (e.g., standard cell 360b) is configured to communicate with a second standard cell (e.g., 360c), by placing the two standard cells in close proximity to each other, the length of the wiring (configured for communicating one or more signals) between the two standard cells can be reduced. Furthermore, in the configuration illustrated in FIG. 3B, a single ground strap and a single power strap can serve multiple rows of standard cells (e.g., row 360a-360z and row 361a-361z).

A Third Example of a Circuit and/or Architecture

Figure 3C:
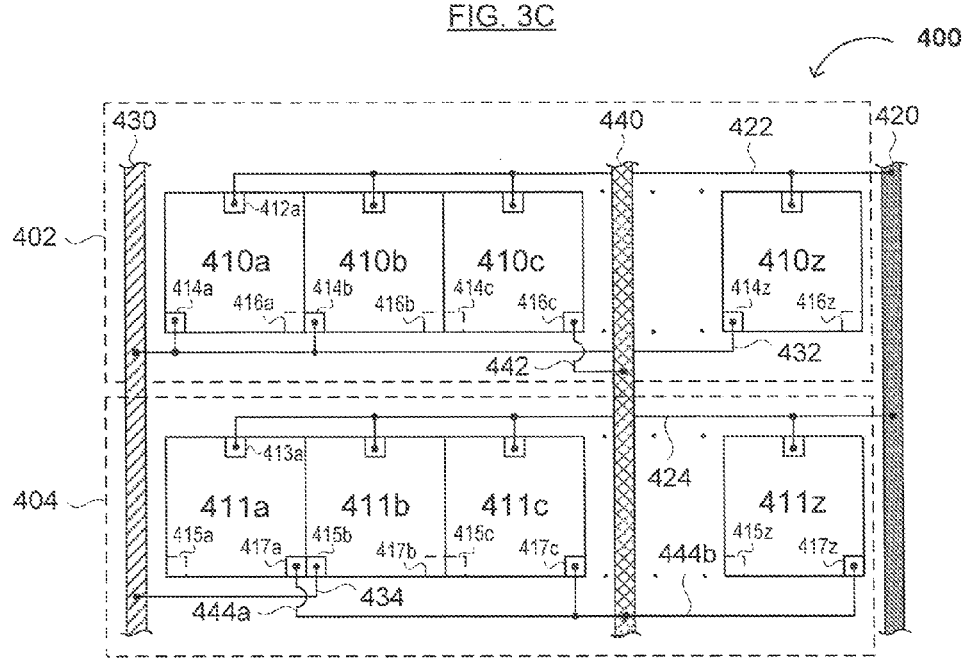
FIG. 3C is a diagram showing a region 400 of an IC utilizing a multiple power rail configuration according to an alternative embodiment of the disclosure.

FIG. 3C shows a region 400 of an IC comprising a first functional block 402 (e.g., a UART block) and a second functional block 404 (e.g., a FM block) according to an embodiment of the present disclosure. As illustrated, each of the functional blocks 402 and 404 utilizes dual power rails (e.g., first power rails 432 and 434, supplied by first strap 430, and second power rails 442, 444a, and 444b, supplied by second strap 440). First strap 430 is configured to provide a first voltage (e.g., a voltage of from about 1.0V to about 3.0V, a voltage of from about 0.8V to about 2.5V, etc.) during a first operational state, and second strap 440 is configured to provide a second voltage (e.g., a voltage of from about 0.8V to about 3.0V, which is typically the same as the first voltage, but which can be different from the first voltage) during a second operational state. First and second straps 430 and 440, respectively, may be switchably connected to a corresponding power supply (not shown) capable of providing the first and second voltage, respectively.

Specifically, the first functional block 402 includes standard cells 410a, 410b, 410c, . . . , 410z, and second functional block 404 includes standard cells 411a, 411b, 411c, . . . 411z. Each of the plurality of standard cells in both the first functional block 402 and the second functional block 404 comprise a ground pin (e.g., pin 412a in standard cell 410a, pin 413a in standard cell 411a, etc.) configured to receive a ground potential from ground supply strap (strap) 420 via one of ground rails 422 or 424. Strap 420 is generally coupled to a ground potential (e.g., a voltage of about 0V), such as an off-chip ground plane (not shown), and is configured to provide the ground potential during an operational state (e.g., an ON state) of the IC or the region 400.

First and second straps 430 and 440, respectively, are spaced apart from each other by a predetermined distance, and may be in the same or different metal layers. Spacing the first and second straps apart from each other reduces capacitive coupling between the first and second straps, facilitates placement of standard cells operating in the same power domain in proximity to each other, and may increase flexibility in routing the power grid and/or power rails. In one embodiment, the distance between first strap 430 and strap 420 is from about 10 microns to about 20 microns.

Similar to standard cells 250, 250a, and 250b discussed above with respect to FIGS. 2A-2E, each of the plurality of standard cells includes second and third pins (e.g., pins 414a and 416a in standard cell 410a, pins 415a and 417a in standard cell 411a, etc.) configured to receive a first voltage or a second voltage from different power nets. For example, referring to the first functional block 402, pins 414a, 414b, and 414z in standard cells 410a, 410b, and 410z receive the first voltage from the first power rail 432. The first power rail 432 is coupled to the first strap 430, and configured to provide the first voltage to the cells 410a-410z in the first functional block 402 during a first operational state of the IC or region 400. Pins 416a, 416b, and 416z may be electronically removed (as indicated by the dashed lines) from standard cells 410a 410b, and 410z. As a result, no voltage is provided at pins 416a, 416b, and 416z in standard cells 410a, 410b, and 410z.

However, standard cell 410c is coupled to second strap 440 via second power rail 442, and receives the second voltage at pin 416c. As shown, no voltage is provided at pin 414c. As a result, pin 414c may be electronically removed (as indicated by the dashed lines) from standard cell 410c. Thus, each of the standard cells in the first functional block 402 are configured to be coupled to either the first strap 430 (via first power rail 432) or the second strap 440 (via second power rail 442).

Similarly, each of the plurality of standard cells in the second functional block 404 is configured to operate at either the first or the second voltage. Specifically, standard cells 411a, 411c, and 411z are configured to receive the second voltage from the second strap 440 (via second power rail 444a or second power rail 444b) at pins 417a, 417c, and 417z, respectively. Pins 415a, 415c, and 415z may therefore be electronically removed (as indicated by the dashed lines) from standard cells 411a, 411c, and 411z. As a result, no voltage is provided at pins 415a, 415c, and 415z of standard cells 411a, 411c, and 411z.

However, standard cell 411b is configured to operate at the first voltage, received from the first strap 430 (via first power rail 434) at pin 415b. Pin 417b may therefore be electronically removed (as indicated by the dashed lines) from standard cell 411b. As a result, no voltage is provided at pin 417b in standard cell 411b. Thus, the standard cells in the second functional block 404 are also configured to operate in either the first power domain or the second power domain.

A Fourth Example of a Circuit and/or Architecture

Figure 3D:
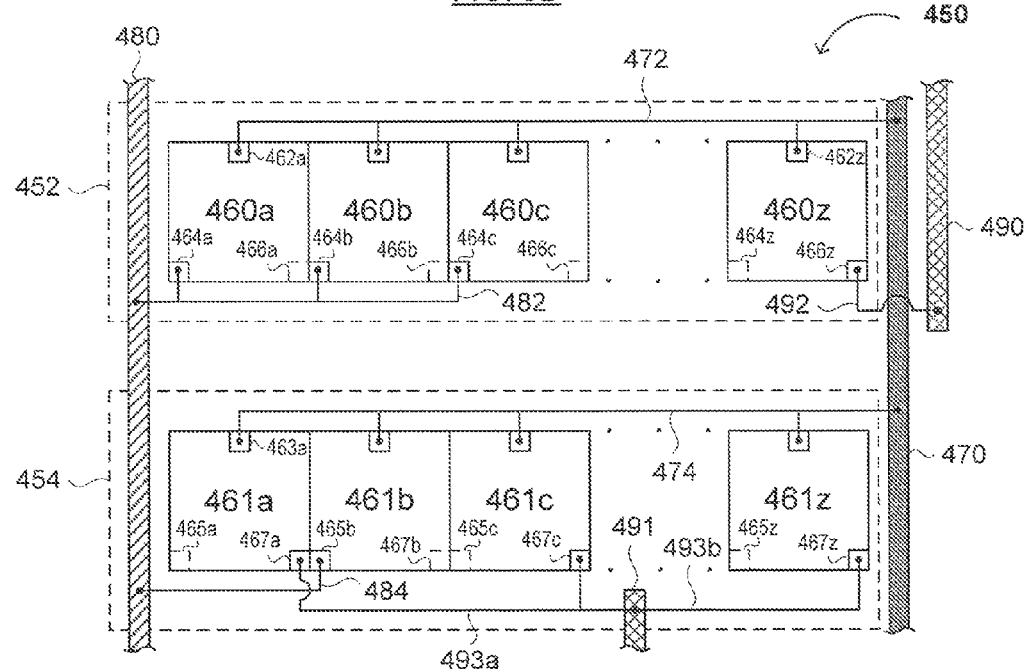
FIG. 3D is a diagram showing a region 450 of an IC utilizing a multiple power rail configuration according to a further alternative embodiment of the disclosure.

FIG. 3D shows a region 450 of an IC comprising a first functional block 452 and a second functional block 454 according to an embodiment of the present disclosure. As illustrated, each of the functional blocks 452 and 454 utilizes dual power nets (physically implemented by different power rails), one of which is common to both functional blocks 452 and 454. For example, the first functional block 452 uses first power rail 482 (connected to first strap 480) and second power rail 492 (connected to strap 490). Additionally, the second functional block 454 uses power rail 484 (which is also connected to first strap 480, and thus, is configured to provide the same voltage to the second functional block 454 as the first power rail 482) connected to first strap 480, and power rails 493a and 493b (which operate as the second power rail, respectively, in the second functional block 454) connected to third strap 491.

First strap 480 provides a first voltage (e.g., a voltage of from about 0.8V to about 3.0V) to each of the first and second functional blocks 452 and 454. Second strap 490 is configured to provide a second voltage (e.g., a voltage of from about 0.8V to about 3.0V) to the first functional block 452. Typically, the second voltage is the same as the first voltage, but in some instances may be different from the first voltage. Additionally, third strap 491 is configured to provide a third voltage to the second functional block 454, wherein the third voltage is part of a different power net from each of the first and the second voltages. For example, the third voltage may be the same as the first and second voltages (e.g., in a range of from about 0.8V to about 3.0V), or different from one or both of the first voltage and the second voltage. However, in one embodiment, third strap 491 provides the same voltage as second strap 490, but the power provided to the first functional block 452 may be switched on or off at different times from the second functional block 454. Thus, first, second, and third straps 480, 490, and 491, respectively are switchably connected to a corresponding power supply (not shown) capable of providing the voltage on the strap. Strap 470 is connected to a ground potential (e.g., a potential of about zero volts; not shown).

Specifically, first functional block 452 includes standard cells 460a, 460b, 460c, ... 460z, and second functional block 454 includes standard cells 461a, 461b, 461c, ... 461z. Each of the plurality of cells in both the first functional block 452 and the second functional block 454 comprise a ground pin (e.g., pins 462a, 462z, and 463a in standard cells 460a, 460z, and 461a, respectively) configured to receive the ground potential from strap 470 via one of ground rails 472 and 474.

Additionally, each of the plurality of standard cells 460a-z and 461a-z in the first and second functional blocks 452 and 454, respectively, includes second and third pins (e.g., pins 464a and 466a in standard cell 460a, pins 465a and 467a in standard cell 461a) configured to receive the first voltage or the second voltage. For example, pin 464a in standard cell 460a is configured to receive the first voltage from the first power rail 482. First power rail 482 is connected to first strap 480 and is configured to provide the first voltage during a first operational state of the IC or of the region 450. To avoid providing a voltage at pin 466a, pin 466a may be electronically removed (as indicated by the dashed lines) from standard cell 460a. Standard cells 460b and 460c in the first functional block 452 also receive the first voltage from first power rail 482 through pins 464b and 464c, respectively, and pins 466b and 466c may be electronically removed (as indicated by the dashed lines) from standard cells 460b and 460c. However, standard cell 460z receives the second voltage from the second power rail 492 (coupled to second strap 490) at pin 466z. As a result, pin 464z may be electronically removed (as indicated by the dashed lines), and no voltage is provided at pin 464z in standard cell 460z. Thus, the standard cells in the first functional block 452 are configured to operate according to either the first power domain or the second power domain.

Similarly, each of the plurality of standard cells 461a-z in the second functional block 454 is configured to operate at the first voltage or a third voltage. Specifically, standard cells 461a and 461c are configured to receive the third voltage from power rail 493a at pins 467a and 467c, respectively, and standard cell 461z is configured to receive the third voltage from power rail 493b at pin 467z. Power rails 493a and 493b are each connected to third strap 491, which provides the third voltage from a corresponding power source (not shown). To avoid a voltage from being provided at pins 465*a*, 465*c*, and 465*z* in standard cells 461*a*, 461*c*, and 461*z*, pins 465*a*, 465*c*, and 465*z* may be electronically removed (as indicated by the dashed lines) from standard cells 461*a*, 461*c*, and 461*z*. However, standard cell 461*b* is configured to operate at the first voltage, received from power rail 484 at pin 465*b*. As a result, pin 467*b* may be electronically removed (as indicated by the dashed lines) from standard cell 461*b*. Thus, each of the plurality of standard cells in the second functional block 454 is configured to operate according to the first power domain or the third power domain.

The configuration illustrated in FIG. 3D allows a common power strap (e.g., first strap 480) and/or ground supply (e.g., via strap 470) to be used in multiple functional blocks (e.g., functional blocks 452 and 454). However, whereas the embodiment of FIG. 3C provides two different power domains via two straps coupled to two functional blocks (e.g., functional blocks 402 and 404), the embodiment of FIG. 3D provides three different power domains (e.g., the first, second, and third straps and/or voltages) to two functional blocks (e.g., functional blocks 452 and 454), with one power domain common to both functional blocks 452 and 454 and a unique domain to each functional block providing different power-down options and/or functionality. For example, the first functional block 452 may be a type of random access memory (e.g., DRAM, SRAM, a register, etc.), in which standard cells 460*a-c* . . . are each a memory storage cell and standard cell 460*z* is a circuit block configured to read or write to standard cells 460*a-c* . . . , and the second functional block 454 may be logic block in which standard cells 461*a* and 461*c* . . . 461*z* are each a logic cell configured for relatively high-speed operation (e.g., in which case the third voltage provided by power rail 493*a-b* may be higher than that provided by first strap 480), and standard cell 460*z* is a memory cell configured to indicate a status or configuration of the second functional block 454.

Although the embodiments shown in FIGS. 3A-3D illustrate particular configurations comprising a plurality of power rails, it is well within the abilities of one skilled in the art to design alternative embodiments of similar ICs comprising a plurality of power rails. For example, referring to FIG. 3C, the first functional block 402 of region 400 may be configured such that standard cells 410*a*, 410*b*, and 410*z* receive the second voltage from the second power rail 442, and standard cell 410*c* receives the first voltage from the first power rail 432, or in FIG. 3D, the second functional block 454 may be configured such that standard cell 461*a* receives the first voltage from power rail 484, and standard cell 410*b* receives the second voltage from power rail 493*a*. Thus, a predetermined number of standard cells in a given region of an IC having a power grid routed according to the present disclosure may be configured to receive any one of a plurality of predefined voltages and operate in any one of a plurality of power domains.

An Example of a Legalization/Local Optimization Algorithm

Figure 4A:
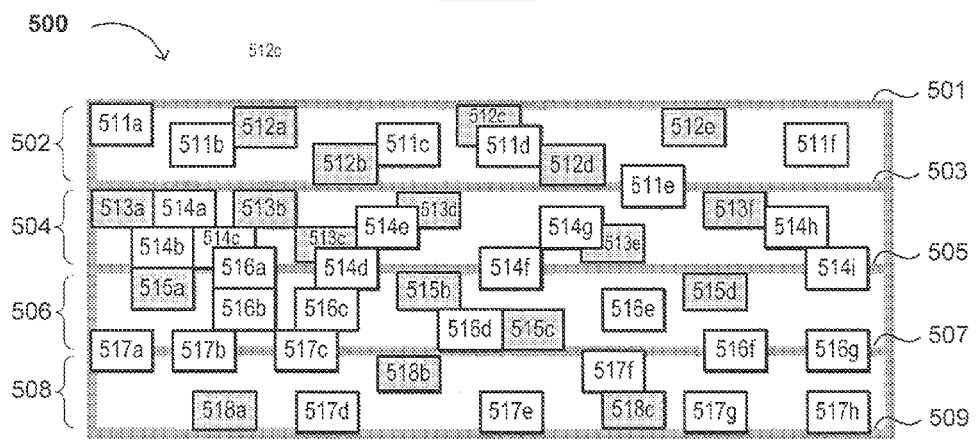
FIGS. 4A-4B illustrate examples of regions 500 and 550 comprising a plurality of standard cells prior to the present disclosure.

FIG. 4A shows a region 500 of an integrated circuit comprising a plurality of voltage row areas 502, 504, 506, and 508 between local power grid straps 501, 503, 505, 507 and 509. A plurality of standard cells are placed in each voltage row area. As shown, the standard cells in each of the voltage row areas 502, 504, 506 and 508 are configured to operate in one of a plurality of power domains. For example, first voltage row area 502 comprises a plurality of cells (e.g., standard cells 511*a*, 511*b*, 511*c*, 511*d*, 511*e*, and 511*f*) configured to receive a first voltage in a first power domain, and a second plurality of standard cells (e.g., standard cells 512*a*, 512*b*, 512*c*, 512*d*, and 512*e*) configured to receive a second voltage in a second power domain. Similarly, second voltage row area 504 comprises a plurality of cells (e.g., standard cells 513*a*, 513*b*, 513*c*, 513*d*, 513*e*, and 513*f*) configured to receive the second voltage in the second power domain, and a second plurality of standard cells (e.g., standard cells 514*a*, 514*b*, 514*c*, 514*d*, 514*e*, 514*f*, 514*g*, 514*h*, and 514*i*) configured to receive the first voltage in the first power domain. Third voltage row area 506 comprises a first plurality of standard cells (e.g., standard cells 515*a*, 515*b*, 515*c*, and 515*d*) configured to receive the second voltage in the second power domain, and a second plurality of standard cells (e.g., 516*a*, 516*b*, 516*c*, 516*d*, 516*e*, 516*f*, and 516*g*) configured to receive the first voltage in the first power domain. Similarly, fourth voltage row area 508 comprises a first plurality of standard cells (e.g., standard cells 517*a*, 517*b*, 517*c*, 517*d*, 517*e*, 517*f*, 517*g*, 517*h*) configured to receive the first voltage in the first power domain, and a second plurality of standard cells (e.g., standard cells 518*a*, 518*b*, and 518*c*) configured to receive the second voltage in the second power domain. Because the first and second power domains can be powered on and powered down separately and/or independently, standard cells in the first power domain can be powered down while standard cells in the second power domain remain powered on, or vice versa. However, as placed, each plurality of standard cells in each voltage row area of the region 500 requires dual voltage rails, thereby increasing the number of local power rails in the local power grid.

The present enhanced legalization/local optimization algorithm can be utilized to minimize the number of voltage rails in the local power grid. If a plurality of standard cells in a given region (e.g., voltage row area 502) are configured to operate in a single power domain (i.e., receive a single power supply provided by a single local power strap), the standard cells can be re-placed and legalized such that a first group of standard cells in a first power domain are placed in the same voltage row and coupled to the same local power strap, and a second group of standard cells in a second power domain are placed in a second voltage row. Placing groups of standard cells in the same power domain within the same voltage row and configuring the cells in the voltage row to receive the same voltage from a common local power strap can minimize the number and/or length of local power straps and/or rails required to provide the common voltage.

Ideally, all standard cells in a particular voltage row receive a common voltage from a single power rail and local power strap. This configuration, arrangement or placement of standard cells enables routing of relatively short, relatively simple interconnects between the standard cells, as well as routing of a single power rail to all cells in the voltage row. As a result, in certain embodiments, the standard cell placement and legalization algorithm includes placing, re-placing or moving cells that are in the same power domain and that are to be placed in proximity to one another in the same voltage row. For example, standard cells 511*a*, 511*b*, 511*c*, 511*d*, 511*e*, and 511*f* that would have been placed in voltage row area 502 of FIG. 4A (e.g., for signal routing purposes) may be placed, or moved or re-placed, as standard cells 552*a*, 552*b*, 552*c*, 552*d*, 552*e* and 552*f* in the top row of voltage area 552 of region 550 in FIG. 4B. Similarly, standard cells 514*a*, 514*b*, 514*c*, 514*d*, 514*e*, 514*f*, 514*g* and 514*h* that would have been placed in voltage row area 502 of FIG. 4A may be placed, or moved or re-placed, as standard cells 552*g*, 552*h*, 552*i*, 552*j*, 552*k*, 552*l*, 552*m*, and 552*n* in the bottom row of voltage area 552 in FIG. 4B. Because all of the standard cells 511*a*, 511*b*, 511c, 511d, 511e, 511f, 514a, 514b, 514c, 514d, 514e, 514f, 514g and 514h are in the same power domain, they can be placed in adjacent voltage rows in a single voltage row area (e.g., voltage row area 552) and provided with a single local power strap (not shown), thereby eliminating a need to route a second local power strap to either of the voltage rows in voltage row area 552.

Figure 4B:
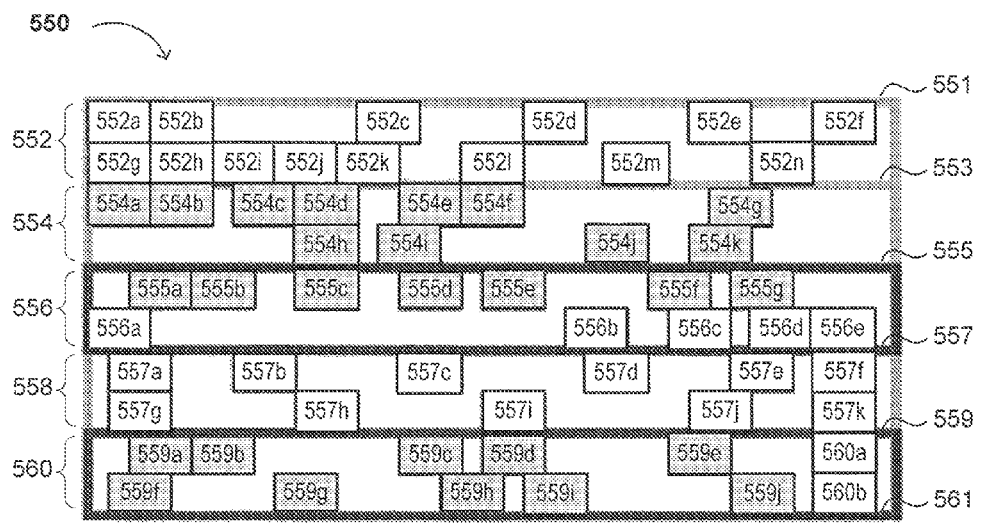

Similarly, the standard cells 512a, 512b, 512c, 512d, and 512e in voltage row area 502 of FIG. 4A and the standard cells 513a, 513b, 513c, 513d, 513e, and 513f in voltage row area 504 of FIG. 4A that are intended to be in the second power domain can be placed, or moved or re-placed, as standard cells 554a, 554b, 554c, 554d, 554e, 554f, 554g, 554h, 554i, 554j and 554k in the top and bottom rows of voltage area 554 in FIG. 4B. As a result, the standard cells 554a-554k in the second power domain can be placed in physical proximity to each other in the voltage rows in voltage row area 554 and receive a common voltage from a single local power strap (not shown).

Alternatively, cells in a first power domain (e.g., standard cells 513c, 513e, 515a, 515b, 515c, and 515d in voltage row areas 504 and 506 of FIG. 4A) can be placed, or moved or re-placed, as standard cells 555a, 555b, 555c, 555d, 555e, 555f and 555g in the top row of voltage area 556 in FIG. 4B, and cells in a second power domain (e.g., five of the standard cells 516a, 516b, 516c, 516d, 516e, 516f, and 516g in voltage row area 504 of FIG. 4A) can be placed, or moved or re-placed, as standard cells 556a, 556b, 556c, 556d and 556e in the bottom row of voltage area 556 in FIG. 4B. As a result, standard cells 555a-555g in the first power domain can be placed in physical proximity to other cells in the same power domain in the same voltage row, and standard cells 556a-556e in the second power domain can be placed in physical proximity to other cells in the same power domain in the same voltage row, each group of standard cells in the same voltage row receiving a common voltage from a single local power strap (not shown).

However, voltage row area 560 in FIG. 4B includes standard cells 559a, 559b, 559c, 559d, 559e, 559f, 559g, 559h, 559h, 559i, and 559j configured to be in the second power domain and standard cells 560a-560b configured to be in the first power domain. In such an arrangement, first and second local power straps (not shown) similar to those shown in FIGS. 3C-3D can be routed to provide the independent first and second voltages to the cells in the respective first and second power domains in voltage row area 560. Alternatively, in view of the other standard cells 556e, 557f and 557k that are also in the first power domain and that are substantially vertically aligned with standard cells 560a-560b, it may be possible to provide a vertical local power strap (not shown) to cells 556e, 557f, 557k, 560a and 560b (see FIG. 4D). By utilizing the present standard cell placement and legalization algorithm, it is estimated that more than ninety-five percent (95%) of the voltage rows in an integrated circuit that do not include a dual rail standard cell can be supplied with a single local voltage strap (i.e., more than 95% of all voltage rows in an integrated circuit that do not include a dual rail standard cell contain standard cells configured for operation in the same power domain).

Figure 4C:
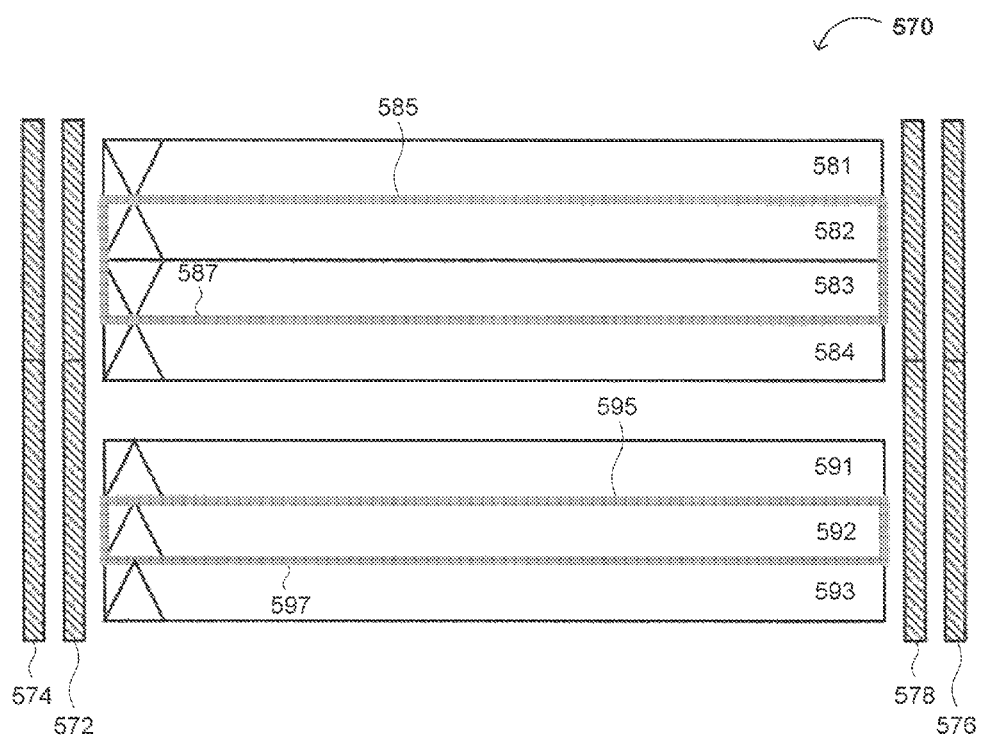
FIG. 4C illustrates two possible voltage row configurations according to the present disclosure.

FIG. 4C shows two variations for routing of local power grids. For example, a region 570 of an IC comprises a plurality of voltage rows 581, 582, 583, 584, 591, 592 and 593. Voltage rows 581, 582, 583 and 584 are arranged in a "flipped" voltage row configuration, similar to that of FIG. 3B. More specifically, in the flipped voltage row configuration, the standard cells in voltage row 581 contain power pins that face voltage row 582, and the standard cells in voltage row 582 contain power pins that face voltage row 581. Consequently, a single local power rail 585 connected to one of the power straps 572, 574, 576 and 578 can provide power to the standard cells in voltage row 581 and voltage row 582. Similarly, a single local power rail 587 connected to one of the power straps 572, 574, 576 and 578 can provide power to the standard cells in voltage rows 583 and 584. As a result, flipped voltage rows 581 and 582 and flipped voltage rows 583 and 584 can each be similar to a voltage row area as described above with regard to FIG. 4B.

In various embodiments, a unique local power rail can be connected to each of the power straps 572, 574, 576 and 578, and routed between flipped voltage rows (e.g., 581 and 582). Alternatively, and depending on the placement of the various power pins in the standard cells, one or more of the local power rails connected to the power straps 572, 574, 576 and 578 can be routed between adjacent flipped voltage row areas (e.g., between voltage row 582 and voltage row 583), similar to the arrangement shown in FIG. 3B. In one embodiment, a single connection (not shown) can be made between the power strap 572, 574, 576 or 578 and the local power rails 585 and 587. Typically, at least one of the power straps 572, 574, 576 and 578 provides a ground potential (e.g., a potential of about 0V).

Voltage rows 591, 592 and 593 are depicted in FIG. 4C in a "non-flipped" configuration, in which one local power rail (e.g., 595 or 597) provides a voltage in a given power domain to one voltage row. In the non-flipped voltage row configuration, the standard cells in voltage rows 591, 592, and 593 contain power pins that are all in the same orientation (e.g., facing in the same direction in the layout of region 570). Consequently, a single local power rail connected to one of the power straps 572, 574, 576 and 578 provides power to the standard cells in a single voltage row. For example, a first local power rail 595 can provide a first voltage in a first power domain to voltage row 592. Similarly, a second local power rail 597 can provide either the first voltage in the first power domain (e.g., when the local power rails 595 and 597 are electrically connected) or a second voltage in a second power domain (e.g., when the local power rails 595 and 597 are connected to different power straps 572, 574, 576 or 578) to voltage row 593.

As described elsewhere herein, one or more of the power straps 572, 574, 576 and 578 can be placed in a power-down or non-operational state, while one or more of the remaining power straps 572, 574, 576 and 578 can be placed (or can remain) in a power-on or operational state. However, typically, at least one of the power straps 572, 574, 576 and 578 provides a ground potential. For example, during a first power cycle or operational state, a first voltage can be provided to power strap 572 from a corresponding first power supply (not shown), and a second voltage can be provided to power strap 574 from a corresponding second power supply (not shown). During a second power cycle or operational state, the first voltage can continue to be provided to power strap 572 from the first power supply, but the second voltage to power strap 574 is switched off from or otherwise powered down by the second power supply. Furthermore, in a third power cycle or operational state, the first voltage to power strap 572 can be switched off from or otherwise powered down by the first power supply, whereas the second voltage to power strap 574 is switched on or powered up by the second power supply.

Thus, the present disclosure further relates to a method of standard cell placement legalization and local optimization that does not use voltage areas, but instead, uses voltage rows, so that cells can be freely placed without being limited by voltage area restrictions. In one embodiment, cells connected to the same power net can first be legalized to occupy one or more predetermined voltage rows so that a majority of the voltage rows need only a single supply. The remainder of the voltage rows may include or consist of cells to be connected to different power nets, and therefore, multiple power rails are to be routed for these voltage rows. The legalization algorithm also includes grouping cells connected to the same power net to be locally close to each other in a voltage row, therefore simplifying the implementation (e.g., routing) of multiple local power rails.

A Fifth Example of a Circuit and/or Architecture

The present disclosure may utilize an additional voltage column strap (e.g., to route a second power supply to dual-supply cells placed according to the present algorithm). The voltage column comprises a plurality of standard cells arranged vertically in the layout and coupled between designated power straps in the local power grid that are configured to provide different voltages (e.g., first and second voltages having different values). Thus, certain standard cells (e.g., dual power supply cells, such as data retention flip-flops, level shifters, etc.) can receive the first voltage from a first voltage strap via a first local power rail, and an additional, second voltage from a second voltage strap via the present voltage column (and, optionally, a second local power rail).

Figure 4D:
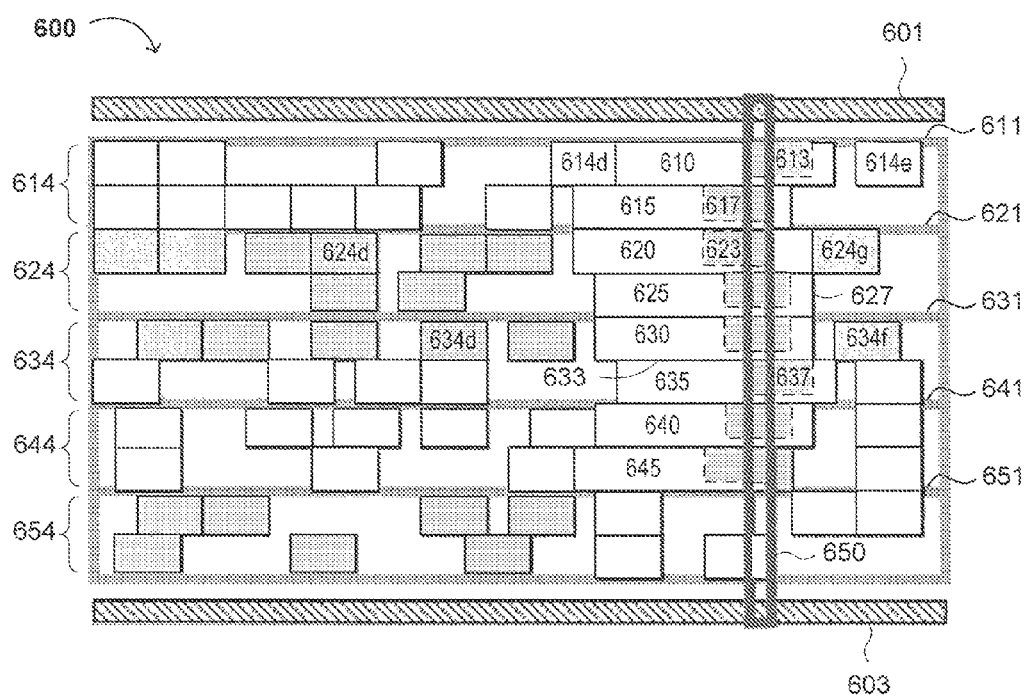
FIG. 4D illustrates an example of a region 600 utilizing a voltage column according to the present disclosure.

As shown in FIG. 4D, region 600 of an IC comprises local power straps 601 and 603, each configured to provide a voltage to one or more voltage rows and to voltage column strap 650, which is electrically connected to local power straps 601 and/or 603. Region 600 further comprises a plurality of voltage row areas 614, 624, 634, 644 and 654, each comprising two standard cell rows in which a plurality of standard cells are placed. The voltage rows in voltage row areas 614, 624, 634 and 644 also include a dual voltage supply (dual supply) cell 610, 615, 620, 625, 630, 635, 640 and 645. Each of the dual supply cells 610, 615, 620, 625, 630, 635, 640 and 645 receive a first voltage from a local power rail (e.g., 611, 621, 631, 641 or 651) and include a second voltage cell region (e.g., 613, 617, 623, 627, 633, and 637) configured to receive a second voltage having a different value from the first voltage. For example, the first voltage may be from 1.0V to 3.3V, and the second voltage may be from 0.8V to 2.5V, or vice versa. Similarly, the first voltage may be greater than the second voltage or less than the second voltage. Thus, voltage column strap 650 is configured to provide a second voltage different from the first voltage to each of the plurality of dual supply cells 610, 615, 620, 625, 630, 635, 640 and 645 in the region 600.

As shown, voltage row area 614 receives a first voltage from local power rail 611. The first voltage is provided to a plurality of single-supply standard cells (e.g., standard cells 614d and 614e) and to dual supply cell 610 in the top row of voltage row 614. As shown, dual supply cell 610 is also coupled to voltage column 650 via a pin in second voltage region 613. Similarly, dual supply cell 615 is coupled to voltage column 650 via a pin in second voltage region 617. The power grid (PG) pin in second voltage regions 613 and 617 can be a rail-like wide pin. Voltage row areas 624, 634 and 644 each comprise voltage rows, a plurality of single-supply standard cells (e.g., standard cells 624d, 624g, 634d and 634f), and a dual supply cell (e.g., dual supply cells 620, 625, 630, 635, 640 and 645). Each of the plurality of standard cells and the dual supply cell 620 in the top row of voltage row area 624 is configured to receive the first voltage via local power rail 621, and each of the plurality of standard cells and the dual supply cells 625 and 630 in the bottom row of voltage row area 624 and the top row of voltage row area 634 is configured to receive the first voltage via local power rail 631.

Alternatively, each of the single supply cells in a voltage row adjacent to a local power rail 621, 631, 641 or 651 can receive a voltage in a different domain from that of the first voltage. The single-supply cells in the fourth and fifth voltage row areas 644 and 654 comprise power pins similar to the single-supply cells in the first, second, and third voltage rows 614, 624, and 634, and can be coupled to any one of a plurality of local power rails in respective power domains. However, there are no dual supply cells in the fifth voltage row area 654.

As shown in FIG. 4D, each of the plurality of dual supply cells are placed in a vertically adjacent fashion and in proximity to voltage column strap 650, according to the present algorithm. By placing second voltage regions 613, 617, 623, 627, 633 and 637 of dual supply cells 610, 615, 620, 625, 630 and 635 adjacent to voltage column strap 650, the connections between the voltage column strap 650 and the second voltage regions 613, 617, 623, 627, 633 and 637 of the dual supply standard cells can be minimized and the local power grid routing strengthened. Ideally, after legalization, placement of dual supply cells 610, 615, 620, 625, 630 and 635 is fixed to minimize voltage column strap movement during later optimization. Forming voltage columns (e.g., voltage column strap 650) is generally considered a local event, and thus, voltage column strap 650 does not necessarily require vertical alignment (e.g., it can contain turns or horizontal portions). Thus, the disclosure also relates to a method of standard cell placement legalization and local optimization that includes routing one or more voltage columns so that dual-rail or dual supply standard cells can be placed in a way that minimizes routing resources for the second power rail and/or voltage supply.

Conventionally, the second power pin in a dual-supply standard cell can create an interlaced power rail configuration in the IC layout. Such a configuration can cause significant cell placement and power grid routing issues, and can cause processing delays and other complications in the place-and-route process. By utilizing the present voltage column strap, dual-supply standard cells can be aligned so that a second power supply can be routed to the dual-supply standard cells without significant formation of an inter-laced power rail configuration, thus substantially avoiding many of the conventional issues associated with such configurations.

A Method for Providing a Region of an IC Layout with a Plurality of Power Rails

Figure 5:
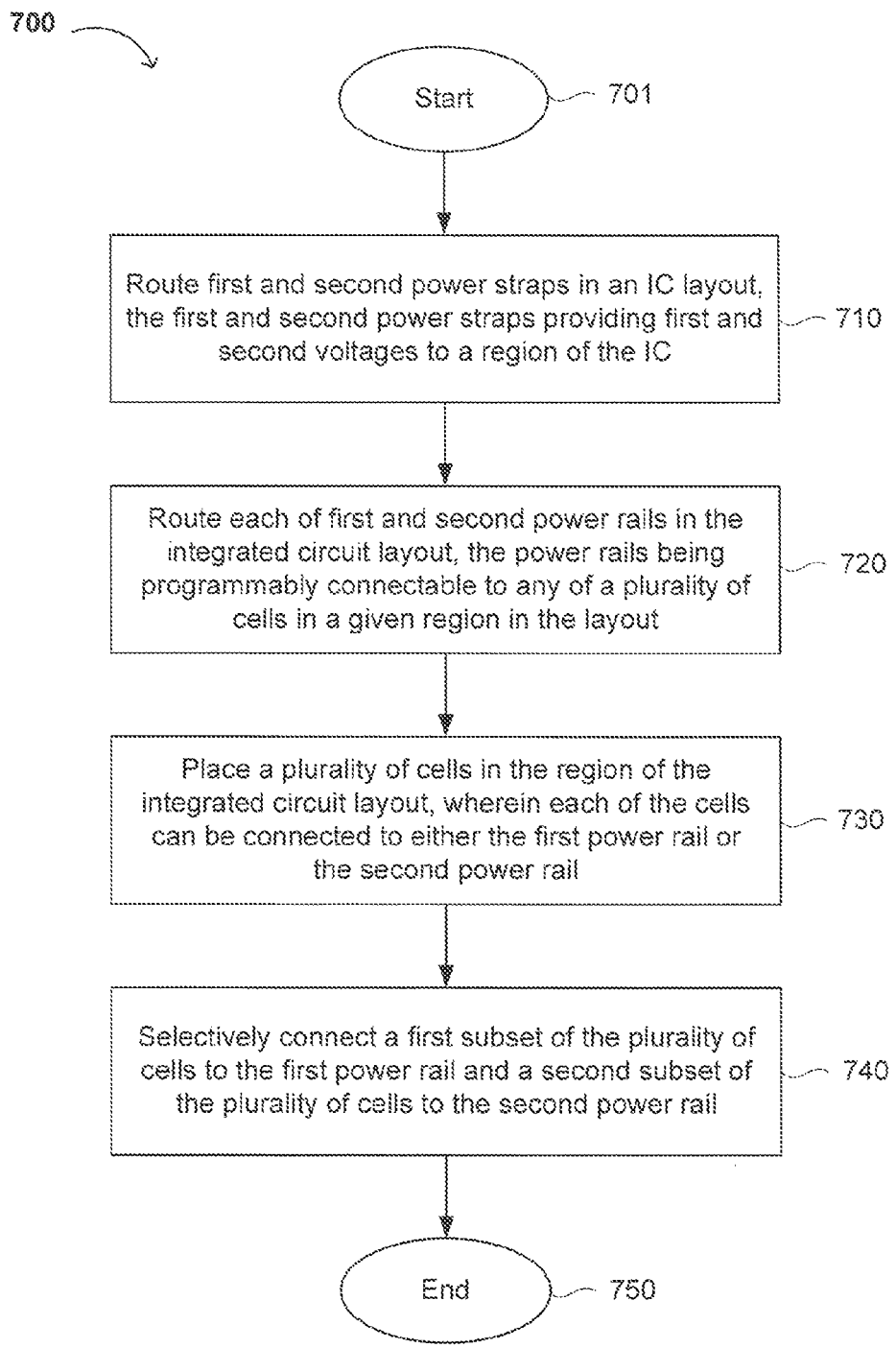
FIG. 5 illustrates a method 700 for connecting a plurality of standard cells to any one of a plurality of power rails in a given region of an IC layout.

FIG. 5 shows a flow chart 700 illustrating a method of providing a plurality of power rails to a region in an IC (e.g., region 300 in FIG. 3A). Generally, the method comprises routing first and second power straps (e.g., first power strap 330 and second poser strap 340 in FIG. 3A), each providing an independent voltage to a region of the IC, then routing first and second power rails configured to provide respective first and second voltages to standard cells in the region of the IC. At 701, the method begins, and at 710, the method routes the global power grid. The global power grid generally comprises the first and second power straps providing first and second voltages to one or more regions of an IC layout. In various embodiments, the first and second voltages may be independent from each other, and the first and second voltages may be the same or different. The method also generally includes routing a ground strap, and at 720, local power rails (e.g., along one or more voltage rows). Following routing of the local power rails, the rails are programmably connectable to any of a plurality of standard cells in a given region in the IC layout. Alternatively, the plurality of power straps may comprise more than two power straps, and the plurality of power rails may comprise more than two power rails. The power straps and power rails can be routed utilizing computer-aided IC design or electronic design automation (EDA) software (e.g., software configured to route power straps and rails, and place standard cells in an IC). In one embodiment, the method further comprises coupling a first independent voltage source to the first power strap, and a second independent voltage source to the second power strap. The first and second voltage sources may provide the same or a different voltage to the first and second power straps, respectively. In other embodiments, the method further comprises routing the first power strap in a first metal layer of the IC layout and the second power strap in a second metal layer of the IC layout, routing the first power rail in a first (or third) metal layer of the IC layout and the second power rail in a second (or fourth) mend layer of the IC layout, or routing the first and second power straps in at least one of first and second metal layers of the IC layout and routing the first and second power rails in at least one of third and fourth metal layers of the IC layout.

At 730, the method comprises placing a plurality of standard cells (e.g., standard cells 310a, 310b, 310c, ... 310z in FIG. 3A) in the region of the IC layout, wherein each of the standard cells may be logically connected to either the first voltage or power net (e.g., first power rail 332 in FIG. 3A) or the second voltage or power net (e.g., second power rail 342 in FIG. 3A). The method does not require that each standard cell be placed according to geographical requirements for its particular voltage and/or power domain. That is, each standard cell can be placed according to other design considerations (e.g., timing and/or congestion considerations). However, as described above with regard to FIG. 4B, the method may comprise placing standard cells in the same power domain in a voltage row or voltage row area. In one embodiment, and prior to 730, the method further comprises identifying a third subset of standard cells configured to operate at a third independent voltage, which may be the same as or different from each of the first and second voltages, and placing the third subset of the plurality of standard cells in a different region (i.e., a region adjacent to a third power net from which the third voltage is provided).

At 740, the method comprises selectively connecting a first subset of the plurality of standard cells in the region of the IC to the first power net (generally via the corresponding local power rail), and a second subset of the plurality of standard cells in the region of the IC to the second power net (generally via the corresponding local power rail). In one embodiment, the method further comprises, when the second subset of the plurality of standard cells comprises at least two standard cells, placing at least one of the first subset of the plurality of standard cells between two standard cells of the second subset of the plurality of cells. Alternatively, the method may comprise placing at least some of the first subset of standard cells together (i.e., adjacent to one another) in proximity to the first power strap or the first power rail, and placing at least some of the second subset of standard cells together (i.e., adjacent to one another) in proximity to the second power strap or the second power rail. At 750, the method ends.

A Method of Generating a Post-Route Local Grid

As discussed above, conventional circuit designs utilize pre-routed global power grids and pre-routed local power grids. That is, power grids (e.g., global and local) are routed before standard cells are placed so that standard cell placement can consider routing of the power grids to regions of the IC layout. However, the present disclosure includes a placement algorithm that freely places standard cells having different power supplies without using voltage areas. Instead, a voltage row and voltage column may be used for refined local legalization and optimization to achieve optimal local power rail connections. One method may include generating final local power rails (e.g., routing actual local power rails) after final cell placement and signal routing is done, so that appropriate local power rails can be generated within each voltage row or column. The present disclosure thus provides a method 800 as shown in FIG. 6 for generating a local power grid after standard cell placement and power grid connections are finalized.

Specifically, at 805 the method begins, and at 810 a global power grid is routed on a chip layout. At 820, a virtual local grid is generated (and optionally, routed). The virtual local grid contains information such as the identity of the power net, the metal layer in which a particular local power rail is to be routed, and/or the type definition of the net in the local power grid. At 830, the standard cells are placed. The standard cells can include single supply cells with multiple power pins (e.g., standard cells 250, 250a and/or 250b in FIGS. 2A-2E) and standard dual rail cells. The standard cells are placed without consideration of the particular voltage domain into which they could be placed, but with consideration as to the power supplies (or domains) that are available based on the global power grid and the virtual local power grid. The software tool (e.g., placer) can accurately estimate global routing and cell congestion based on the virtual local power grid. Decap cells can be inserted based on the standard cells that are placed on a particular voltage row. At 840, the signals between various standard cells in the design are routed in detail. If present, dual rail cells are not necessarily coupled to both a local power rail and a voltage column strap in the virtual local power grid.

At 850, the virtual local power grid is converted to a "post-route" local power grid. Each rail (and each strap in the local power grid coupled to a particular power rail) can be customized to provide an independent voltage supply to each of a plurality of standard cells. Additionally, at 850, one or more processes to convert the virtual local power grid to a "post-route" local power grid can be executed. For example, a rail conversion process to convert a power rail or strap adjacent to a voltage row can occur. The rail conversion process is based on the standard cells within each particular voltage row. If all standard cells in a voltage row belong to same power net, then the entire rail is converted to that particular power net. In other words, a single local power rail is routed along that voltage row. If not, the present algorithm converts the power rail into multiple power nets based on the ratio and/or location of cells belonging to each power net within a voltage row. In some embodiments, local power grid rails and connections can be routed in a lowermost (first) metal layer M1 and/or next-to-lowermost (second) metal layer M2.

A second process that may take place during the virtual local power grid to post-route local grid conversion process is power rail conversion, which is based on the number of power nets in a virtual local power grid area. For example, if an entire virtual local grid requires only one power net, then only the local power grid for that net is generated within the virtual local power grid area. However, if the virtual local power grid requires more than one power net, then separate local power grids for each net are generated in the virtual local power grid area.

A third process that may take place during the virtual local power grid to post-route local power grid conversion process is voltage column strap addition (if utilized within the particular voltage region). In one embodiment, a new voltage column strap (e.g., normal or substantially perpendicular to the local power straps connected to the power rails in the layout) is defined to provide a voltage to those cells that were not correctly estimated during the placement stage, but which could or should have been accurately estimated with the router. For example, in embodiments utilizing dual rail flip-flops or level shifters, additional power straps connectable to the second power pins of the dual rail cells can be added to provide a second voltage source for the dual rail cells, because the virtual local power grid may have provided only a single power net to the dual rail cells. Thus, embodiments requiring additional power nets may employ a voltage column strap. However, in some embodiments, one may minimize the use of voltage column straps in order to avoid overly complicating or congesting the layout in certain regions or areas. At 855, the method ends.

In a further embodiment, the virtual local power grid enables a place and route tool to estimate the impact (e.g., one or more properties, such as resistance, capacitance, power consumption, etc.) of the final local power grid more accurately and/or correctly. After all cell placements are finalized, the final local power grid can be generated for each voltage row and/or voltage column (e.g., row-by-row and/or column-by-column), taking into consideration whether the voltage row or voltage column needs one, or more than one, power rail.

Software

The present invention also includes algorithms, computer program(s) and/or software, implementable and/or executable in a general purpose computer or workstation equipped with a conventional digital signal processor, configured to perform some or all of the method and/or one or more operations of the hardware. Thus, a further aspect of the invention relates to algorithms and/or software that implement the above methods. For example, the invention may further relate to a tangible computer-readable medium containing a set of instructions which, when executed by an appropriate processing device (e.g., a signal processing device, such as a microcontroller, microprocessor or DSP device) is configured to route each of a plurality of power rails in an integrated circuit (IC) layout, the plurality of power rails comprising (i) a first power rail providing a first voltage and (ii) a second power rail providing a second voltage (which may be independent from the first voltage); place the plurality of cells in the IC layout, wherein each of the plurality of cells can be connected to either of the first power rail or the second power rail; and selectively connect a first subset of the plurality of cells to the first power rail and a second subset of the plurality of cells to the second power rail.

The computer program may be on any kind of tangible computer-readable medium, and the tangible computer-readable medium may comprise any medium that can be read by a processing device configured to read the medium and execute code stored thereon or therein, such as a floppy disk, CD-ROM, magnetic tape or hard disk drive. Such code may comprise object code, source code and/or binary code.

The set of instructions may also further comprise at least one instruction configured to (i) connect the first power rail to the first subset of cells and to couple the second power rail to the second subset of cells; (ii) place the first power rail adjacent to the second power rail; and/or (iii) provide a first voltage from a first voltage source to the first power rail, and a second voltage from a second voltage source to the second power rail. In one embodiment, the set of instructions may further comprise at least one instruction configured to place the first power rail adjacent to the second power rail.

CONCLUSION/SUMMARY

Thus, embodiments of the present disclosure provide integrated circuitry comprising multiple straps, architectures and systems including such circuitry, and methods and algorithms for designing such circuitry using standard cells.

The foregoing descriptions of embodiments of the present disclosure have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A circuit comprising:
a plurality of cells in a first region of said circuit, each of said plurality of cells being configured for connection to any one of a plurality of power rails, wherein:
a first subset of cells of the plurality of cells has first and second power pins;
the first power pin is configured for connection to a first power rail of said plurality of power rails, and the second power pin is configured for connection to a second power rail of said plurality of power rails;
the first power rail is coupled to the first subset of cells through the first power pin and is configured to provide a first voltage;
the second power pin is physically deleted from being connected to said second power rail; and
the second power rail is coupled to a remaining cell of said plurality of cells and is configured to provide a second voltage.

2. The circuit of claim 1, wherein said second power rail is separated from said first power rail by an intervening dielectric.

3. The circuit of claim 1, wherein said first voltage and said second voltage have substantially a same value.

4. The circuit of claim 1, wherein said first and second power rails are adjacent or separated.

5. The circuit of claim 1, wherein said first and second power rails are in a same metal layer.

6. The circuit of claim 1, wherein said first and second power rails are in different metal layers.

7. The circuit of claim 1, wherein at least two of said plurality of cells that are coupled to said first power rail are adjacent to each other.

8. A method of distributing power to a plurality of cells in an integrated circuit layout, the method comprising:
routing, using processor circuitry, each of a plurality of power rails in said integrated circuit layout, said plurality of power rails comprising a first power rail configured to provide a first voltage and a second power rail configured to provide a second voltage;
placing said plurality of cells in said integrated circuit layout, wherein each of said plurality of cells is configured for connection to anyone of said first power rail and said second power rail, wherein a first subset of cells of the plurality of cells has first and second power pins, and wherein the first power pin is configured for connection to the first power rail and the second power pin is configured for connection to the second power rail;
coupling the first subset of cells to said first power rail through the first power pin; and
physically deleting the second power pin from being connected to said second power rail.

9. The method of claim 8 further comprising:
coupling a first independent voltage source to said first power rail; and
coupling a second independent voltage source to said second power rail, wherein the first and second power rails are each configured for connection to each of the plurality of cells.

10. The method of claim 8, wherein a distance between said first and second power rails is approximately 10-20 microns.

11. The method of claim 8, wherein:
each of the plurality of cells is associated with a first power pin configured for connection to the first power rail and a second power pin configured for connection to the second power rail; and
a second subset of cells of the plurality of cells is selectively coupled to the second power rail through the second power pin.

12. The method of claim 8, wherein:
at least one of the plurality of cells has:
reconfigurable power and/or ground pins; or
multiple copies of power and/or ground pins at different locations in the cell; and
after the power rails are routed, all but one power pin and all but one ground pin is removed from the at least one of the plurality of cells.

13. The method of claim 8, wherein the plurality of cells are placed in voltage rows such that a majority of the voltage rows include only cells that are to be connected to a same power rail, further comprising grouping cells connected to the same power rail locally close to each other in the same or adjacent voltage rows.

14. The method of claim 8, wherein at least one of the plurality of cells is a dual-rail standard cell, further comprising routing a voltage column configured to provide one of the first and second voltages to at least the dual-rail standard cell.

15. The method of claim 8, wherein the circuitry is configured to connect said first power rail to said first subset of cells and to connect said second power rail to a second subset of cells.

16. The method of claim 8, wherein the circuitry is configured to place said first power rail adjacent to said second power rail.

17. A method of designing a power grid in an integrated circuit layout, the method comprising:
routing, using processor circuitry, a global power grid in said integrated circuit layout, said global power grid comprising a plurality of power straps in one or more first metallization layers, said plurality of power straps comprising a first power strap configured to provide a first voltage and a second power strap configured to provide a second voltage;
routing a virtual local power grid, said virtual local power grid comprising a plurality of power nets coupled to one of said first and second power straps;
placing a plurality of cells in said integrated circuit layout, wherein each of said plurality of cells is configured for connection to anyone of first and second power nets, wherein the first power net is coupled to the first power strap and the second power net is coupled to said second power strap, wherein a first subset of cells of the plurality of cells has first and second power pins, and wherein the first power pin is configured for connection to the first power net and the second power pin is configured for connection to the second power net;
coupling the first subset of cells to said first power net through the first power pin;
physically deleting the second power pin from being connected to said second power net; and
converting said virtual local power grid to an actual local power grid.

18. The method of claim 17, wherein routing the virtual local power grid further comprises routing a voltage column configured to provide one of the first and second voltages to at least a subset of said plurality of cells.

19. The method of claim 17, wherein each of said plurality of power nets comprises a metal line in one or more second metallization layers.

20. The method of claim 17, wherein each of said one or more first metallization layers is in a higher metallization level than each of said metal lines in said one or more second metallization layers.

21. The method of claim 17, further comprising estimating an impact of the actual local power grid from the virtual local power grid using a place and route tool, wherein the plurality of cells are placed in voltage rows such that the cells in a given voltage row are connected to one of a first power rail or a second power rail, and converting the virtual local power grid to the actual local power grid comprises generating the actual local power grid for each voltage row, based on a determination of whether the voltage row needs one power rail or more than one power rail.

* * * * *